(12) United States Patent
Iwai et al.

(10) Patent No.: US 10,194,392 B2
(45) Date of Patent: Jan. 29, 2019

(54) TERMINAL DEVICE, WIRELESS DEVICE WIRELESSLY COMMUNICATING WITH THE SAME, AND WIRELESS COMMUNICATION SYSTEM INCLUDING THE TERMINAL DEVICE AND WIRELESS DEVICE

(71) Applicants: Advanced Telecommunications Research Institute International, Soraku-gun, Kyoto (JP); NEC Communication Systems, Ltd., Minato-ku, Tokyo (JP)

(72) Inventors: Masahito Iwai, Minato-ku (JP); Yukihiro Hara, Minato-ku (JP); Tetsuya Ito, Minato-ku (JP); Takatoshi Kimura, Soraku-gun (JP); Akio Hasegawa, Soraku-gun (JP)

(73) Assignees: ADVANCED TELECOMMUNICATIONS RESERACH INSTITUTE INTERNATIONAL, Kyoto (JP); NEC COMMUNICATION SYSTEMS, LTD., Tokyo (JP)

( * ) Notice: Subject to any disclaimer, the term of this patent is extended or adjusted under 35 U.S.C. 154(b) by 80 days.

(21) Appl. No.: 14/832,092

(22) Filed: Aug. 21, 2015

(65) Prior Publication Data
US 2016/0044596 A1 Feb. 11, 2016

Related U.S. Application Data

(63) Continuation of application No. PCT/JP2013/073406, filed on Aug. 30, 2013.

(30) Foreign Application Priority Data
Feb. 27, 2013 (JP) .................................. 2013-036728

(51) Int. Cl.
*H04W 52/02* (2009.01)
*H04W 40/24* (2009.01)
(Continued)

(52) U.S. Cl.
CPC ....... *H04W 52/0229* (2013.01); *H04L 5/0048* (2013.01); *H04W 40/005* (2013.01);
(Continued)

(58) Field of Classification Search
CPC ................................................ H04W 52/0229
See application file for complete search history.

(56) References Cited

U.S. PATENT DOCUMENTS

| | | | | |
|---|---|---|---|---|
| 7,990,920 B2 * | 8/2011 | Zhang | .................. | H04B 7/0671 370/329 |
| 8,014,305 B1 * | 9/2011 | Gilbert | .............. | H04W 36/0083 370/252 |

(Continued)

FOREIGN PATENT DOCUMENTS

| | | |
|---|---|---|
| JP | 2007-526655 A | 9/2007 |
| WO | 2004/100503 A2 | 11/2004 |

OTHER PUBLICATIONS

Rohde & Schwarz, "Generating Signals for Wireless LANs", published din 2002.*

(Continued)

*Primary Examiner* — Parth Patel
(74) *Attorney, Agent, or Firm* — Keating & Bennett, LLP

(57) ABSTRACT

When a terminal device initiates a wireless communication when it has not established a wireless link between itself and another wireless device, it transmits, as a management frames in active scanning, a plurality of activation probe requests having frame lengths representing an identifier of a wireless base station to which connection is being made and which is intended to transition from sleep mode to operating (Continued)

mode. Then, the wireless base station receives the plurality of activation probe requests transmitted by the terminal device as management frames in active scanning in a wireless LAN, and, when a plurality of dummy network identifiers detected based on the received plurality of activation probe requests represent the identifier of its own, transitions from sleep mode to operating mode.

14 Claims, 18 Drawing Sheets

(51) Int. Cl.
  *H04W 40/00* (2009.01)
  *H04L 5/00* (2006.01)
  *H04W 84/12* (2009.01)
(52) U.S. Cl.
  CPC .......... *H04W 40/246* (2013.01); *H04W 84/12* (2013.01); *Y02D 70/00* (2018.01); *Y02D 70/142* (2018.01); *Y02D 70/144* (2018.01); *Y02D 70/22* (2018.01)

(56) References Cited

U.S. PATENT DOCUMENTS

| | | | | |
|---|---|---|---|---|
| 8,018,882 B1* | 9/2011 | Chhabra | ............... | H04W 28/18 370/235 |
| 8,144,799 B2* | 3/2012 | Murakami | ........... | H04B 7/0413 370/480 |
| 8,175,047 B2* | 5/2012 | Seok | ..................... | H04W 28/06 370/329 |
| 8,391,260 B1* | 3/2013 | Kopikare | ............. | H04W 8/005 370/338 |
| 8,493,977 B2* | 7/2013 | Vempati | ................ | H04L 43/10 370/389 |
| 8,917,614 B2* | 12/2014 | Luo | ....................... | H04B 7/024 370/252 |
| 9,002,282 B1* | 4/2015 | de la Broise | ............ | H04B 1/40 375/144 |
| 9,288,754 B2* | 3/2016 | Abraham | ........... | H04W 52/0206 |
| 9,301,325 B1* | 3/2016 | Sanap | ................... | H04W 76/02 |
| 9,332,485 B1* | 5/2016 | Lambert | ............... | H04W 8/005 |
| 9,510,274 B2* | 11/2016 | Jeong | .................... | H04W 48/16 |
| 9,602,228 B1* | 3/2017 | Warnes | .................. | H04L 27/04 |
| 9,638,537 B2* | 5/2017 | Abramson | ......... | G01C 21/3626 |
| 9,661,560 B2* | 5/2017 | Park | ....................... | H04W 48/16 |
| 2002/0037016 A1* | 3/2002 | Suzuki | .................. | C10G 27/12 370/442 |
| 2004/0137908 A1* | 7/2004 | Sinivaara | ............. | H04W 48/20 455/452.1 |
| 2006/0111103 A1* | 5/2006 | Jeong | .................... | H04W 48/14 455/434 |
| 2007/0115877 A1* | 5/2007 | Zhen | ..................... | H04W 72/10 370/329 |
| 2007/0115881 A1* | 5/2007 | Ohkubo | ................ | H04L 1/1809 370/329 |
| 2007/0189249 A1* | 8/2007 | Gurevich | ............... | H04L 45/20 370/338 |
| 2007/0253468 A1 | 11/2007 | Pettersen et al. | | |
| 2007/0258384 A1* | 11/2007 | Sammour | ............. | H04W 36/24 370/252 |
| 2007/0286121 A1* | 12/2007 | Kolakowski | ...... | H04L 29/06027 370/329 |
| 2009/0036052 A1* | 2/2009 | Miyanaga | ............ | H04B 7/022 455/18 |
| 2009/0097584 A1* | 4/2009 | Takai | .................... | H04B 7/022 375/267 |
| 2009/0253392 A1* | 10/2009 | Colonna | ............... | G01S 5/0252 455/161.3 |
| 2009/0290493 A1* | 11/2009 | Xu | ........................ | H04W 28/08 370/237 |
| 2009/0303937 A1* | 12/2009 | Sawahashi | ........... | H04W 74/02 370/329 |
| 2010/0039969 A1* | 2/2010 | Sukenari | ............. | H04W 52/325 370/310 |
| 2010/0161490 A1* | 6/2010 | Alrabady | .............. | H04W 12/08 705/50 |
| 2011/0013606 A1* | 1/2011 | Seok | ..................... | H04W 8/005 370/338 |
| 2011/0219452 A1* | 9/2011 | Porter | ................. | H04L 63/1425 726/23 |
| 2011/0261766 A1* | 10/2011 | Tang | ..................... | H04W 24/00 370/329 |
| 2011/0294493 A1* | 12/2011 | Nagaraja | .............. | H04J 11/0069 455/422.1 |
| 2011/0305143 A1* | 12/2011 | Gray | ...................... | H04L 45/02 370/242 |
| 2012/0082097 A1* | 4/2012 | Cosimini | ............... | H04B 7/022 370/328 |
| 2012/0209934 A1* | 8/2012 | Smedman | ........... | H04L 12/5692 709/208 |
| 2013/0070746 A1* | 3/2013 | Xu | ........................ | H04W 28/06 370/338 |
| 2013/0142124 A1* | 6/2013 | Abraham | ............... | H04W 28/06 370/328 |
| 2013/0176897 A1* | 7/2013 | Wang | .................... | H04W 12/06 370/254 |
| 2013/0176980 A1* | 7/2013 | Kneckt | .................. | H04W 28/26 370/329 |
| 2013/0177001 A1* | 7/2013 | Abraham | ............... | H04W 28/06 370/338 |
| 2013/0229996 A1* | 9/2013 | Wang | ................ | H04W 72/0413 370/329 |
| 2013/0281056 A1* | 10/2013 | Abraham | ............... | H04W 48/16 455/411 |
| 2013/0294354 A1* | 11/2013 | Zhang | ................... | H04W 72/04 370/329 |
| 2014/0006787 A1* | 1/2014 | Measson | ................ | H04W 12/04 713/171 |
| 2014/0010089 A1* | 1/2014 | Cai | ........................ | H04W 48/16 370/241 |
| 2014/0010223 A1* | 1/2014 | Wang | .................... | H04W 48/12 370/338 |
| 2014/0079043 A1* | 3/2014 | Montemurro | ..... | H04W 52/0216 370/338 |
| 2014/0112325 A1* | 4/2014 | Calcev | .................. | H04W 48/16 370/338 |
| 2014/0119289 A1* | 5/2014 | Kasslin | ............. | H04W 74/0833 370/329 |
| 2014/0153674 A1* | 6/2014 | Stratigos, Jr. | ........... | H04L 27/06 375/340 |
| 2014/0192713 A1* | 7/2014 | Park | ..................... | H04B 7/2656 370/328 |
| 2014/0241157 A1* | 8/2014 | Tan | ....................... | H04J 3/0638 370/235 |
| 2014/0314064 A1* | 10/2014 | Park | ..................... | H04W 84/12 370/338 |
| 2015/0117424 A1* | 4/2015 | Jeong | .................... | H04W 48/16 370/338 |
| 2016/0134395 A1* | 5/2016 | Kawasaki | ............... | H04L 5/005 370/330 |

OTHER PUBLICATIONS

Mishra et al., "Wake-on-WLAN", WWW 2006, May 23-26, 2006, 9 pages.
Ishida et al., "A Multi-step Wake-up Scheme for Low-Power-Listening Wireless Communication System", IEICE Technical Report, IN2007-218, Mar. 2008, pp. 355-360.

* cited by examiner

Fig. 6
| NUMBER OF CHARACTERS OF ESSID (BYTE) | FRAME LENGTH($\mu s$) |
|---|---|
| 0 | L=200 |
| 1 | L=208 |
| 2 | L=216 |
| ⋮ | ⋮ |
| 31 | L=448 |
| 32 | L=456 |
TBL1
Fig. 7
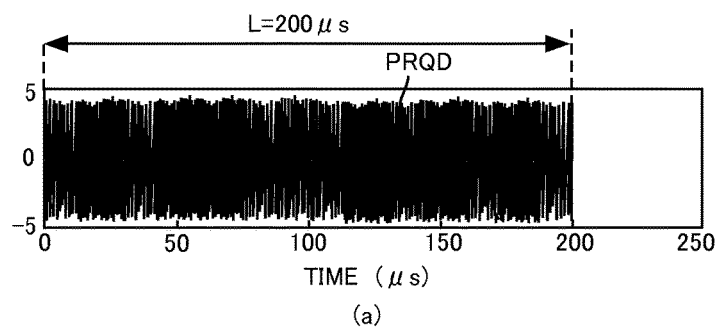
(a)
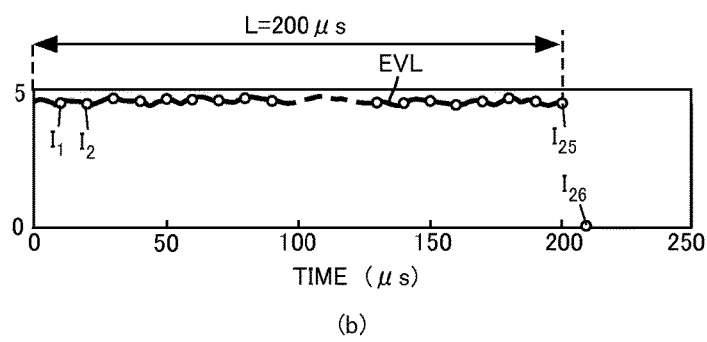
(b)

| NUMBER OF CHARACTERS OF ESSID (BYTE) | DIFFERENTIAL FRAME LENGTH($\mu$ s) |
|---|---|
| 0 | $\Delta L=0$ |
| 1 | $\Delta L=8$ |
| 2 | $\Delta L=16$ |
| ⋮ | ⋮ |
| 31 | $\Delta L=248$ |
| 32 | $\Delta L=256$ |

TBL2

Fig. 20

| NUMBER OF CHARACTERS OF ESSID (BYTE) | DIFFERENTIAL FRAME LENGTH/REFERENCE VALUE |
|---|---|
| 0 | 0 |
| 1 | 1 |
| 2 | 2 |
| ... | ... |
| 31 | 31 |
| 32 | 32 |

TBL3

TERMINAL DEVICE, WIRELESS DEVICE WIRELESSLY COMMUNICATING WITH THE SAME, AND WIRELESS COMMUNICATION SYSTEM INCLUDING THE TERMINAL DEVICE AND WIRELESS DEVICE

BACKGROUND OF THE INVENTION

1. Field of the Invention

The present invention relates to a terminal device, a wireless device wirelessly communicating with such a terminal device and a wireless communication system including such a terminal device and wireless device.

2. Description of the Related Art

Techniques have been proposed to use 802.15.4 sensor motes that consume less power than wireless local area network (LAN) cards to observe a wireless LAN channel that is at the same frequency and, when a terminal detects a radio wave from a transmitter, to wake up the wireless LAN card of this terminal (Nilesh Mishra, Kameswari Chebrolu, Bhaskaran Raman, Abhinav Pathak: Wakeon WLAN, WWW 2006).

Further, a technique has been proposed to use a wake-up receiver that consumes still less power to wake up a wireless LAN card (JP 2007-526655 A, WO 04/100503, U.S. Pat. Pub. No. 2007/0253468, and Shigemi Ishida, Makoto Suzuki, Takashi Morito, Hiroyuki Morikawa: A Multi-step Wake-up Scheme for Low-Power-Listening Wireless Communication System, IEICE technical report, IN2007-218, p. 355-360, March 2008).

SUMMARY OF THE INVENTION

A problem with Patent Documents 1 to 3 and Non-patent Documents 1 and 2 is that, since wireless communication occurs via an access point, a wireless device that is not allocated to the access point cannot transmit a wake-up signal for waking up another wireless device.

The present invention was made to solve this problem. An object of the present invention is to provide a terminal device that can control another device even when it cannot transmit a radio frame.

Another object of the present invention is to provide a wireless device that can wirelessly communicate with a terminal device that can control another device even when it cannot transmit a radio frame.

Still another object of the present invention is to provide a wireless communication system including a terminal device that can control another device even when it cannot transmit a radio frame.

In a preferred embodiment of the present invention, a terminal device includes an instructing circuitry and a transmitting circuitry. The instructing circuitry generates an instruction signal that instructs initiation of control. The transmitting circuitry, when having received the instruction signal, uses a probe request which is a management frame in active scanning in a wireless LAN to generate a plurality of control probe requests representing an identifier and having one or more frame lengths, and transmits the generated plurality of control probe requests on one or more channels in the active scanning.

In another preferred embodiment of the present invention, a wireless device includes a detection circuitry and a control circuitry. The detection circuitry detects a plurality of frame lengths of a plurality of control probe requests representing an identifier and having one or more frame lengths. When the detected plurality of frame lengths represent an identifier, the control circuitry generates a control signal.

When initiating control, the terminal device according to a preferred embodiment of the present invention transmits a plurality of control probe requests having frame lengths that represent an identifier in active scanning.

Thus, the terminal device can control another device even when it cannot transmit a radio frame.

Further, the wireless device according to a preferred embodiment of the present invention detects a plurality of frame lengths of a plurality of control probe requests and, when the detected plurality of frame lengths represent an identifier, generates a control signal.

Thus, the wireless device can control another device even when it cannot transmit a radio frame.

Furthermore, in a wireless communication system according to a preferred embodiment of the present invention, when initiating control, a terminal device transmits a plurality of control probe requests having frame lengths that represent an identifier in active scanning. Then, the wireless device detects the received plurality of frame lengths of the plurality of control probe requests from the terminal device and, when the detected plurality of frame lengths represent an identifier, generates a control signal.

Thus, the wireless device can control another device even when it cannot transmit a radio frame.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6 is a conversion table for the number of characters of an ESSID and the frame length which is the time length of an activation probe request.

FIG. 7 illustrates concepts of envelope detection and bit determination.

FIG. 20 is a conversion table of the number of characters of an ESSID and differential frame length/reference value.

DETAILED DESCRIPTION OF THE PREFERRED EMBODIMENTS

Figure 1:
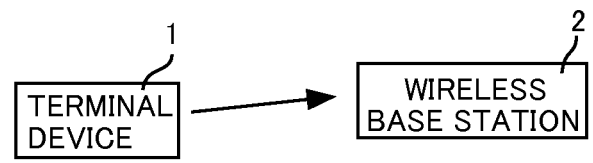
FIG. 1 is a schematic diagram of a wireless communication system according to a preferred embodiment of the present invention.

Preferred embodiments of the present invention will be described in detail with reference to the drawings. The same or corresponding components in the drawings are labeled with the same characters, and their description will not be repeated.

FIG. 1 is a schematic diagram of a wireless communication system according to a preferred embodiment of the present invention. Referring to FIG. 1, a wireless communication system 10 according to a preferred embodiment of the present invention includes a terminal device 1 and a wireless base station 2.

If the terminal device 1 has not established a wireless link between itself and a wireless base station 2 or another wireless device, i.e. a device other than the wireless base station 2, it provides a plurality of activation probe requests representing an identifier of the wireless base station 2 that is intended to transition from sleep mode to operating mode and having one or more frame lengths and transmits them as management frames in active scanning in a wireless LAN to the wireless base station 2 on all channels.

The plurality of activation probe requests are management frames that can be transmitted by a terminal device that is not allocated to a wireless base station, and, as discussed below, are created using probe requests that are management frames in active scanning in a wireless LAN. All channels are a plurality of frequency channels and are all the channels for a wireless communication scheme (for example, IEEE802.11b) that is typically employed in the wireless communication system 10. In the wireless communication scheme of IEEE802.11b, all channels are 14 frequency channels Ch1 to Ch14.

The wireless base station 2 receives the plurality of activation probe requests from the terminal device 1 on one of all channels (i.e. one of channels Ch1 to Ch14). Then, the wireless base station 2 detects the plurality of frame lengths of the plurality of activation probe requests that have been received, and, when the plurality of frame lengths that have been detected represent an identifier of this wireless base station, transitions from sleep mode to operating mode.

Preferred Embodiment 1

Figure 2:
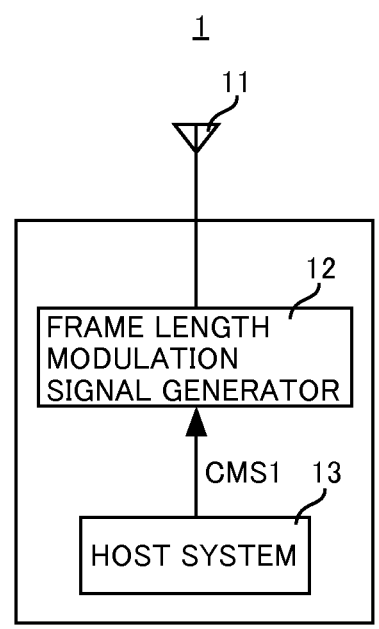
FIG. 2 is a schematic diagram of a configuration of the terminal device of FIG. 1 according to preferred embodiment 1.

FIG. 2 is a schematic diagram of a configuration of the terminal device 1 of FIG. 1 according to preferred embodiment 1. Referring to FIG. 2, the terminal device 1 includes an antenna 11, a frame length modulation signal generator 12 and a host system 13.

In the host system 13, a group of extended service set identifiers (ESSIDs) that generates an wake-up ID for causing a wireless base station 2 to transition from sleep mode to operating mode are set in advance. The ESSID group is composed of a plurality of network identifiers, some of which are dummy network identifiers.

If the terminal device 1 has not established a wireless link between itself and the wireless base station 2 or another wireless device, i.e. a device other than the wireless base station 2, the frame length modulation signal generator 12 receives from the host system 13 an instruction signal CMS1 for initiating a communication between itself and the wireless base station 2 and a plurality of frame lengths that represent an identifier of the wireless base station 2.

Then, in response to the instruction signal CMS1, the frame length modulation signal generator 12 generates a plurality of activation probe requests PRQD1 to PRQDn (n is an integer not smaller than 2) having a plurality of frame lengths, and transmits the plurality of activation probe requests PRQD1 to PRQDn that have been generated on all channels Ch1 to Ch14 via the antenna 11.

As described below, the plurality of activation probe requests PRQD1 to PRQDn are generated based on a plurality of network identifiers that are dummy network identifiers, and are different from the probe request PRQ which is a management frame in active scanning in a wireless LAN.

That is, this probe request PRQ is a management frame including an ESSID that is a network identifier of the network that includes the wireless base station to which connection is being made. On the other hand, the plurality of activation probe requests PRQD1 to PRQDn are generated based on a plurality of network identifiers including a network identifier of the network that includes the wireless base station to which connection is being made as well as a dummy network identifier that is decided independently from the network identifier of the network that includes the wireless base station to which connection is being made. Thus, the plurality of activation probe requests PRQD1 to PRQDn are different from the probe request PRQ.

When the host system 13 initiates a wireless communication with a wireless base station 2 that is in sleep mode, it outputs the instruction signal CMS1 to the frame length modulation signal generator 12. Further, the host system 13 determines a plurality of frame lengths that represent an identifier of the wireless base station 2 based on the ESSID group that it holds, and outputs the determined plurality of frame lengths to the frame length modulation signal generator 12.

Although not shown in FIG. 2, the terminal device 1 further includes a transceiver that modulates data from the host system 13 and transmits radio frames that include the modulated data to the wireless base station 2 via the antenna 11, and that also receives the radio frames from the wireless base station 2 via the antenna 11, demodulates the received radio frames, and outputs the data resulting from this demodulation to the host system 13.

Figure 3:
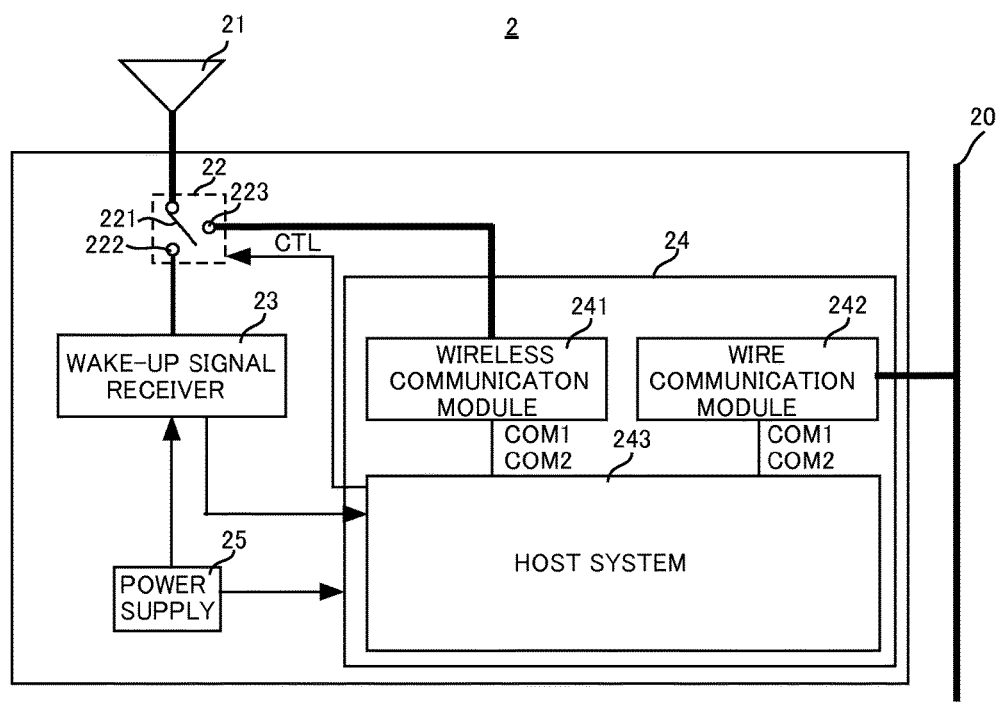
FIG. 3 is a schematic diagram of a configuration of the wireless base station of FIG. 1 according to preferred embodiment 1.

FIG. 3 is a schematic diagram of a configuration of the wireless base station 2 of FIG. 1 according to preferred embodiment 1. Referring to FIG. 3, the wireless base station 2 includes an antenna 21, a switching device 22, a wake-up signal receiver 23, a main device 24, and a power supply 25.

The antenna 21 is connected to the wake-up signal receiver 23 or main device 24 via the switching device 22.

The switching device 22 is connected between the antenna 21 and the wake-up signal receiver 23 and main device 24.

The antenna 21 receives a plurality of activation probe requests PRQD1 to PRQDn from the terminal device 1 using wireless communication, and outputs the received plurality of activation probe requests PRQD1 to PRQDn to the wake-up signal receiver 23 via the switching device 22. Further, the antenna 21 receives radio frames from the terminal device 1 using wireless communication and outputs the received radio frames to the main device 14. Furthermore, the antenna 21 transmits the radio frames that have been received from the main device 24 to the terminal device 1 using wireless communication.

In response to a control signal CTL from the main device 24, the switching device 22 connects the antenna 21 to the wake-up signal receiver 23 or main device 24.

The wake-up signal receiver 23 may receive 100 μW power, for example, from the power supply 25 and be driven by the received power. When the main device 24 is in sleep mode, the wake-up signal receiver 23 is connected to the antenna 21 via the switching device 22. When the wake-up signal receiver 23 receives a plurality of activation probe requests PRQD1 to PRQDn from the terminal device 1 via the antenna 21 on one of all channels Ch1 to Ch14, it detects the plurality of frame lengths of the received plurality of activation probe requests PRQD1 to PRQDn, and determines whether the detected plurality of frame lengths match an identifier of the wireless base station 2. If the wake-up signal receiver 23 determines that the plurality of frame lengths match the identifier of the wireless base station 2, it generates an activation signal and outputs the generated activation signal to the main device 24.

If the plurality of frame lengths do not match the identifier of the wireless base station 2, the wake-up signal receiver 23 discards the plurality of activation probe requests. The wake-up signal receiver 23 then waits for receiving a plurality of activation probe requests.

The wake-up signal receiver 23 only has the function of receiving a plurality of activation probe requests PRQD1 to PRQDn for waking up the wireless base station 2, and does not have the function of transmitting radio frames in a wireless LAN.

The main device 24 may receive 7 W power, for example, from the power supply 25 and be driven by the received power.

When the main device 24 is in operating mode, it wirelessly communicates with the terminal device 1 via the antenna 21 and communicates with other communication devices via a cable 20.

When the main device 24 has not wirelessly communicated with the terminal device 1 in a certain period of time, T1, or when no terminal device is allocated to the wireless base station 2, the main device 24 transitions from operating mode to sleep mode. The certain period T1 may be several dozens of seconds, for example.

Further, when the main device 24 in sleep mode receives the activation signal from the wake-up signal receiver 23, it transitions from sleep mode to operating mode.

The power supply 25 supplies 100 μW power to the wake-up signal receiver 23 and supplies 7 W power to the main device 24.

The switching device 22 includes a switch 221 and terminals 222 and 223. The main device 24 includes a wireless communication module 241, wire communication module 242 and host system 243.

The switch 221 is connected to the antenna 21. The terminal 222 is connected to the wake-up signal receiver 23. The terminal 223 is connected to the wireless communication module 241.

The switch 221 receives the control signal CTL from the host system 243 of the main device 24. Then, depending on the control signal CTL, the switch 221 connects the antenna 21 to the terminal 222 or terminal 223.

In the present implementation, the control signal CTL may be composed of an L (logical low) level signal or an H (logical high) level signal. If the control signal CTL is composed of the L level signal, the switch 221 connects the antenna 21 to the terminal 222, and, if the control signal CTL is composed of the H level signal, connects the antenna 21 to the terminal 223.

When the wireless communication module 241 receives a command signal COM1 from the host system 243, it transitions from operating mode to sleep mode, and, when it receives a command signal COM2 from the host system 243, it transitions from sleep mode to operating mode. The sleep mode is a mode in which the wireless communication module 241 is not operating.

When the wireless communication module 241 transitions to operating mode, the wireless communication module 241 regularly transmits beacon frames Beacon via the antenna 21 to establish a wireless link with the terminal device 1. Then, the wireless communication module 241 wirelessly communicates with the terminal device 1. In this case, the wireless communication module 241 retrieves data from a radio frame received from the terminal device 1 and outputs the retrieved data to the host system 243, and generates a radio frame containing data received from the host system 243 and transmits it to the terminal device 1.

The wire communication module 242 receives data from other communication devices via the cable 20 and outputs the received data to the host system 243.

The wire communication module 242 also receives data from the host system 243 and transmits the received data to other communication devices via the cable 20.

Further, when the wire communication module 242 receives the command signal COM1 from the host system 243, it transitions from operating mode to sleep mode, and, when it receives the command signal COM2 from the host system 243, it transitions from sleep mode to operating mode. The sleep mode is a mode in which the wire communication module 242 is not operating.

When the host system 243 has not received a radio frame from the terminal device 1 via the wireless communication module 241 in a certain period T1, or when no terminal device is in the communication area of the wireless base station 2, the host system generates the command signal COM1 and outputs the generated command signal COM1 to the wireless communication module 241 and wire communication module 242, and generates the control signal CTL indicative of the L level to output it to the switching device 22. Then, the host system 243 transitions to sleep mode (i.e. non-operating mode).

When the host system 243 receives the activation signal from the wake-up signal receiver 23, it transitions from sleep mode to operating mode. The host system 243 then generates the command signal COM2 and outputs the generated command signal COM2 to the wireless communication module 241 and wire communication module 242, and generates the control signal CTL indicative of the H level to output it to the switch device 22.

Further, when the host system 243 receives data from the wireless communication module 241, it outputs the received data to the wire communication module 242.

Further, when the host system 243 receives data from the wire communication module 242, it outputs the received data to the wireless communication module 141.

Further, the host system 243 manages terminal devices present in the communication area of the wireless base station 2.

Figure 4:
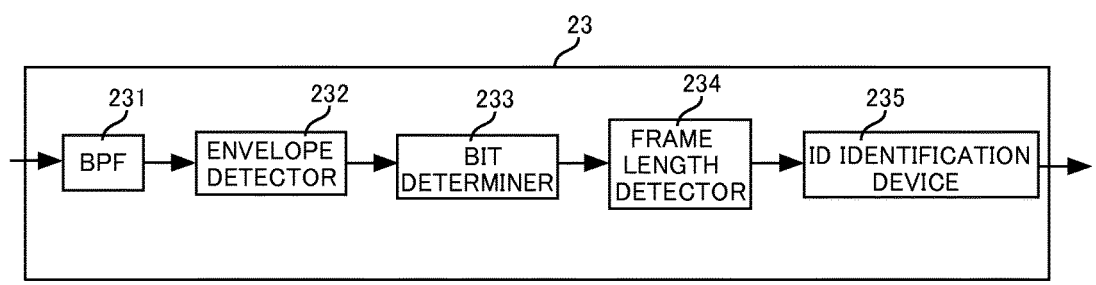
FIG. 4 illustrates a configuration of the wake-up signal receiver of FIG. 3.

FIG. 4 illustrates a configuration of the wake-up signal receiver 23 of FIG. 3. Referring to FIG. 4, the wake-up signal receiver 23 includes a band pass filter (BPF) 231, an envelope detector 232, a bit determiner 233, a frame length detector 234 and an ID identification device 235.

The BPF 231 receives a radio wave via the antenna 21 and switching device 22, and outputs to the envelope detector 232 those portions of the received radio wave that have the frequency of one of all channels Ch1 to Ch14.

The envelope detector 232 detects an envelope of the reception radio wave received from the BPF 231 at a certain interval (for example, 8 μs) and outputs the detected signal to the bit determiner 233.

The bit determiner 233 converts the detected signal received from the envelope detector 232 to a bit value of "0" or "1", and outputs the resulting bit sequence to the frame length detector 234.

The frame length detector 234 detects the frame lengths of the plurality of activation probe requests PRQD1 to PRQDn based on the bit sequence received from the bit determiner 233. More specifically, the frame length detector 234 counts the cumulative number of bits of the value "1" and, when a bit with the value "0" is input, detects the frame length based on the cumulative number, and then outputs the detected frame length to the ID identification device 235 and resets the cumulative value.

The ID identification device 235 holds in advance a plurality of frame lengths representing an identifier of the wireless base station 2. Then, the ID identification device 235 receives frame lengths from the frame length detector 234 and holds the received frame lengths.

When the ID identification device 235 held a plurality of frame lengths, it determines whether the plurality of frame lengths match an identifier of the wireless base station 2 (i.e. the plurality of frame lengths held in advance). If the plurality of frame lengths match the identifier of the wireless base station 2, the ID identification device 235 generates the activation signal and outputs it to the host system 243.

Figure 5:
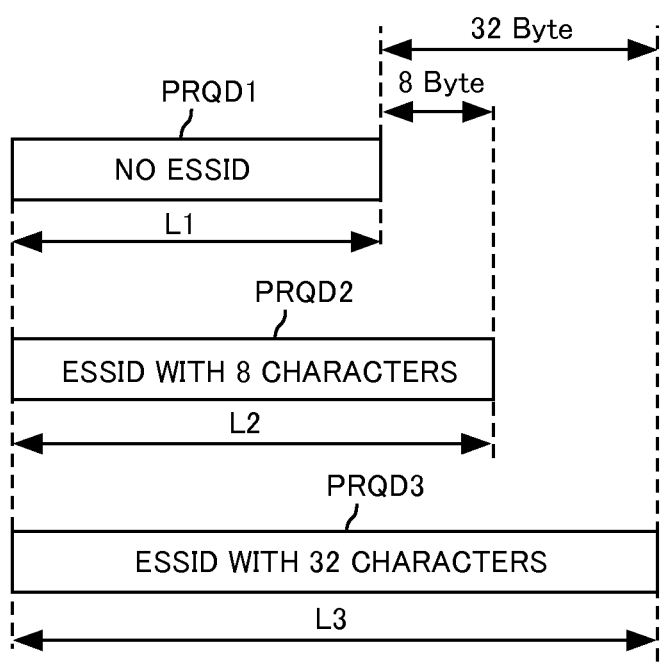
FIG. 5 is a conceptual representation of activation probe requests.

FIG. 5 is a conceptual representation of activation probe requests. Referring to FIG. 5, the activation probe request PRQD1 is a probe request without an ESSID, the activation probe request PRQD2 is a probe request with an ESSID composed of 8 characters, and the activation probe request PRQD3 is a probe request with an ESSID composed of 32 characters.

The activation probe requests PRQD1 to PRQD3 have the frame lengths L1 to L3, respectively.

The frame length L1 is a frame length set by the designer of the wireless communication system 10. The frame length L2 is 8 bytes longer than the frame length L1. The frame length L3 is 32 bytes longer than the frame length L1.

In view of this, in a preferred embodiment of the present invention, a plurality of network identifiers are generated each made up of a number of characters that is in the range of 0 to 32 bytes and including some that are dummy ESSIDs, and an identifier of the wireless base station 2 is represented by a plurality of frame lengths corresponding to the generated plurality of network identifiers.

Then, if the number of characters of a given network identifier (i.e. ESSID) is 0 bytes, an activation probe request PRQD1 is generated using a probe request PRQ for which the number of characters is set to "0" bytes.

Further, if the number of characters of a given network identifier (i.e. ESSID) is 8 bytes, characters of 8 bytes are added to the probe request PRQ for which the number of characters was set to "0" bytes to create an activation probe request PRQD2.

Furthermore, if the number of characters of a given network identifier (i.e. ESSID) is 32 bytes, characters of 32 bytes are added to the probe request PRQ for which the number of characters was set to "0" bytes to create an activation probe request PRQD3.

If the number of characters of a given network identifier (i.e. ESSID) is a value other than 0, 8 and 32 bytes, an activation probe request PRQDi (i=1 to n) is created in an analogous manner.

Thus, the activation probe requests PRQD1 to PRQDn are created using the probe request PRQ.

As a result, the frame length of the activation probe request PRQDi can be varied in the range of the frame lengths L1 to L3 as the number of characters is set to a value in the range of 0 to 32 bytes.

In a preferred embodiment of the present invention, an identifier of the wireless base station 2 is represented by a plurality of numbers of characters of a plurality of network identifiers (i.e. a plurality of ESSIDs), including a case where the number of characters of a network identifier (i.e. ESSID) is 0 bytes. As a result, each wireless base station can be identified based on a plurality of frame lengths corresponding to a plurality of numbers of characters of a plurality of network identifiers (i.e. a plurality of ESSIDs).

In the wireless communication scheme of IEEE802.11b, the probe request PRQ is transmitted at the lowest transmission rate, i.e. 1 Mbps. As a result, 8 bytes corresponds to the length of 64 μs and 32 bytes corresponds to the length of 256 μs. That is, the length for 1 byte is 8 μs.

Thus, if the frame length L1 is 200 μs, an identifier of each wireless base station can be represented by a plurality of frame lengths in the range of 200 μs to 456 μs.

The plurality of network identifiers (i.e. a plurality of ESSIDs) may be made up of, for example, dummy ESSID=0, dummy ESSID=a, ESSID=abcdefg, dummy ESSID=abcd, dummy ESSID=abcdefghij and the like, where dummy ESSID=0, dummy ESSID=a, ESSID=abcdefg, dummy ESSID=abcd, dummy ESSID=abcdefghij and the like constitute an ESSID group. This ESSID group is set in advance in the host system 13 of the terminal device 1 and the ID identification device 235 of the wireless base station 2.

Thus, a plurality of network identifiers (i.e. a plurality of ESSIDs) include dummy ESSIDs and actual ESSIDs.

Here, characters such as a, b, c, d, e, f, g, h, i and j each indicates 1 byte.

FIG. 6 is a conversion table for the number of characters of an ESSID and the frame length L which is the time length of an activation probe request. Referring to FIG. 6, the conversion table TBL1 contains numbers of characters of ESSID and frame lengths. The numbers of characters of ESSID are associated with the frame lengths.

The frame length L of 200 μs is associated with the number of characters of 0 byte. The frame length L of 208 μs is associated with the number of characters of 1 byte. The frame length L of 216 μs is associated with the number of characters of 2 bytes. Other frame lengths are associated with numbers of characters in a similar manner, and, the frame length L of 448 μs is associated with the number of characters of 31 bytes, and the frame length L of 456 μs is associated with the number of characters of 32 bytes.

The host system 13 of the terminal device 1 holds the conversion table TBL1. Then, for example, if a dummy ESSID made of the number of characters of 0 bytes, a dummy ESSID made of the number of characters of 3 bytes and an ESSID made of the number of characters of 8 bytes constitute an ESSID group, the host system 13 refers to the conversion table TBL1 and assigns the frame length L=200 μs to the dummy ESSID made of the number of characters of 0 bytes, assigns the frame length L=224 μs to the dummy ESSID made of the number of characters of 3 bytes, and assigns the frame length L=264 μs to the ESSID made of the number of characters of 8 bytes.

Then, the host system 13 outputs three frame lengths, i.e. 200 μs, 224 μs and 264 μs, to the frame length modulation signal generator 12. Then, the frame length modulation signal generator 12 receives the frame lengths of 200 μs, 224 μs and 264 μs from the host system 13 and generates three activation probe requests PRQDs having the frame lengths of 200 μs, 224 μs and 264 μs that have been received, and transmits the generated three activation probe requests PRQDs on all channels Ch1 to Ch14.

A similar process is used in cases where the ESSID group is made of a plurality of network identifiers having numbers of characters other than 0 bytes, 3 bytes, and 8 bytes.

FIG. 7 illustrates concepts of envelope detection and bit determination. Referring to FIG. 7, the envelope detector 232 of the wake-up signal receiver 23 receives a reception radio wave of an activation probe request PRQD from the BPF 231. The activation probe request PRQD has a frame length L of 200 μs, for example (see (a)).

The envelope detector 232 detects an envelope EVL of the activation probe request PRQD, detects the detected envelope EVL at an interval of 8 (μs), and detects the detected values $I_1$ to $I_{26}$ (see (b)).

Then, the envelope detector 232 outputs the detected values $I_1$ to $I_{26}$ to the bit determiner 233. The bit determiner 233 determines the bit values of the detected values $I_1$ to $I_{26}$ and obtains the bit sequence "111 . . . 1110". The bit determiner 233 then outputs the bit sequence "111 . . . 1110" to the frame length detector 234.

The frame length detector 234 accumulates bit value of "1" starting from the beginning of the bit sequence "111 . . . 1110" and obtains the cumulative value of "25". Since the value of the 26th bit is "0", the frame length detector 234 multiplies the cumulative value of "25" by 8 μs to detect a frame length of 200 μs, and outputs the detected frame length of 200 μs to the ID identification device 235 and resets the cumulative value.

The ID identification device 235 receives the frame length of 200 μs from the frame length detector 234 and holds the received frame length of 200 μs.

The envelope detector 232, frame length detector 234 and ID identification device 235 process the activation probe request PRQD having the frame length of 224 μs and the activation probe request PRQD having the frame length of 264 μs in an analogous manner.

Then, when the ID identification device 235 holds the frame length of 200 μs, the frame length of 224 μs and the frame length of 264 μs, it determines whether the frame length of 200 μs, the frame length of 224 μs and the frame length of 264 μs that have been held match the identifier of the wireless base station 2.

If the frame length of 200 μs, the frame length of 224 μs and the frame length of 264 μs match the identifier of the wireless base station 2, the ID identification device 235 generates the activation signal and outputs it to the main device 24. On the other hand, if the frame length of 200 μs, the frame length of 224 μs and the frame length of 264 μs do not match the identifier of the wireless base station 2, the ID identification device 235 discards the frame length of 200 μs, the frame length of 224 μs and the frame length of 264 μs.

Figure 8:
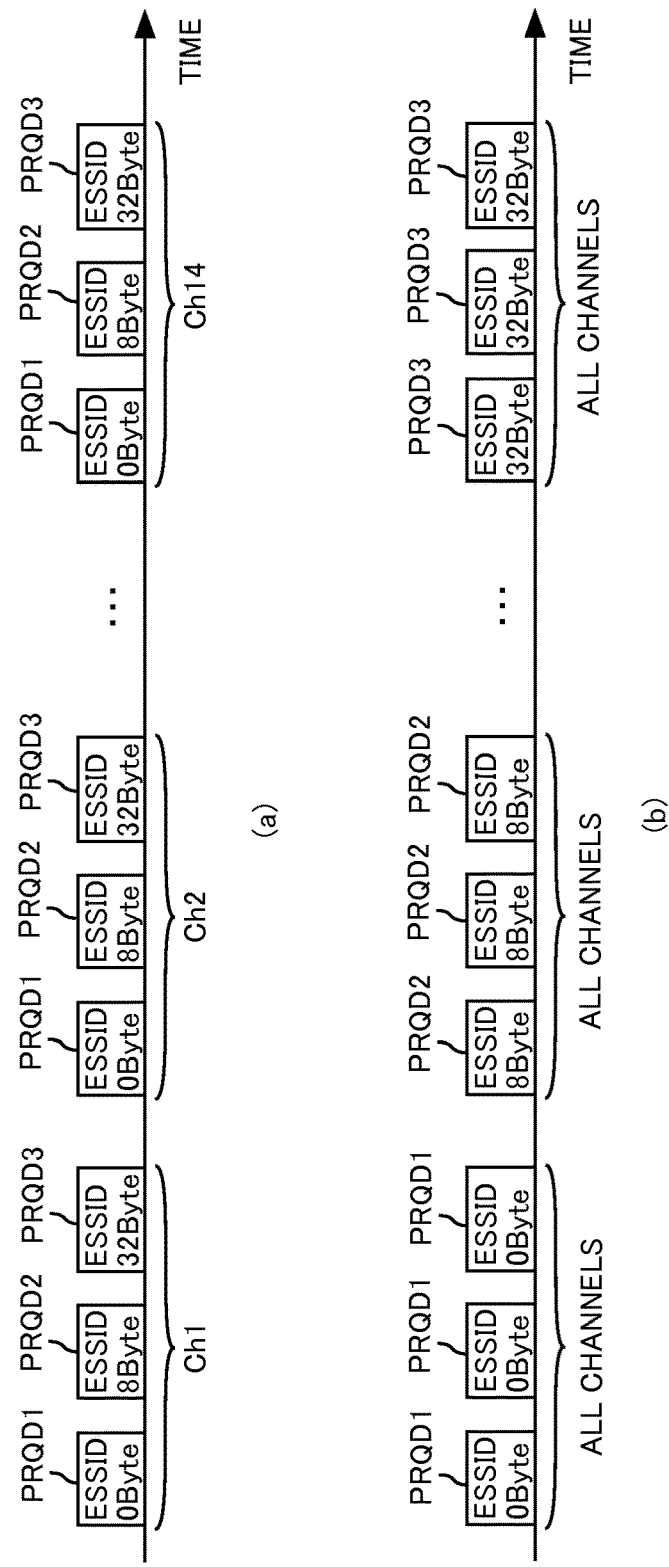
FIG. 8 illustrates concepts of the method of transmitting an activation probe request.

FIG. 8 illustrates concepts of the method of transmitting an activation probe request PRQD. Referring to FIG. 8, if the ESSID group is made of a dummy ESSID made of the number of characters of 0 bytes, the ESSID made of the number of characters of 8 bytes and a dummy ESSID made of the number of characters of 32 bytes, three kinds of activation probe requests PRQ1 to PRQ3 are generated, as described above.

Then, the activation probe requests PRQD1 to PRQD3 are transmitted on channel Ch1, and then transmitted on channel Ch2, and transmitted in an analogous manner and then transmitted on channel CH14 (see FIG. 8(a)). That is, the activation probe requests PRQD1 to PRQD3 are transmitted on all channels Ch1 to Ch14, on a channel-by-channel basis.

The activation probe request PRQD1 is transmitted a plurality of times on all channels Ch1 to Ch14, then, the activation probe request PRQD2 is transmitted a plurality of times on all channels Ch1 to Ch14, and, similarly, the activation probe request PRQD3 is transmitted a plurality of times on all channels Ch1 to Ch14 (see FIG. 8(b)). That is, the activation probe requests PRQD1 to PRQD3 are transmitted on all channels Ch1 to Ch14 as the process of transmitting an activation probe request PRQD having one frame length a plurality of times on all channels Ch1 to Ch14 is performed on every one of the activation probe requests PRQD1 to PRQD3.

If the activation probe requests PRQD1 to PRQD3 are transmitted by the method illustrated in FIG. 8(a), the wireless base station 2 preferably transitions from sleep mode to operating mode when it has received the plurality of frame lengths that represent the identifier of its own a plurality of times. This improves the reliability with which the wireless base station 2 transitions from sleep mode to operating mode.

Further, if the activation probe requests PRQD1 to PRQD3 are transmitted by the method illustrated in FIG. 8(b), when there is a change in frame length, the wireless base station 2 recognizes that the frame length of the activation probe request PRQD with this frame length with a change is relevant in connection with the identifier.

In FIG. 8(b), each of the activation probe requests PRQD1 to PRQD3 is transmitted on all channels Ch1 to Ch14 three times. If the activation probe request PRQD1 is transmitted on all channels Ch1 to Ch14, the wireless base station 2 starts to receive an activation probe request PRQD1, and thus it recognizes a change in frame length when it receives the first activation probe request PRQD1 at the state where it has received nothing, and recognizes that the frame length of the first activation probe request PRQD1 is relevant in connection with the identifier. Then, since there is no change in frame length when the wireless base station 2 receives the second and third activation probe requests PRQD1, it ignores the frame lengths of the second and third activation probe requests PRQD1.

When, after the three activation probe requests PRQD1, the wireless base station 2 receives the first activation probe request PRQD2, there is a change in frame length, and thus it recognizes that the frame length of the activation probe request PRQD2 is relevant in connection with the identifier. Then, since there is no change in frame length when the wireless base station 2 receives the second and third activation probe requests PRQD2, it ignores the frame lengths of the second and third activation probe requests PRQD2.

An analogous process occurs when an activation probe request PRQD3 is received.

The plurality of activation probe requests PRQD1 to PRQDn may have the same frame length, or have different frame lengths. For example, if the five frame lengths of five activation probe requests PRQD1 to PRQD5 represent an identifier of the wireless base station 2, the five activation probe requests PRQD1 to PRQD5 may have the frame lengths of L1, L1, L1, L1 and L1, may have the frame lengths of L1, L1, L2, L2 and L2, or may have frame lengths of L1, L2, L3, L4 and L5. Thus, in general terms, the plurality of activation probe requests PRQD1 to PRQDn may have one or more frame lengths.

Figure 9:
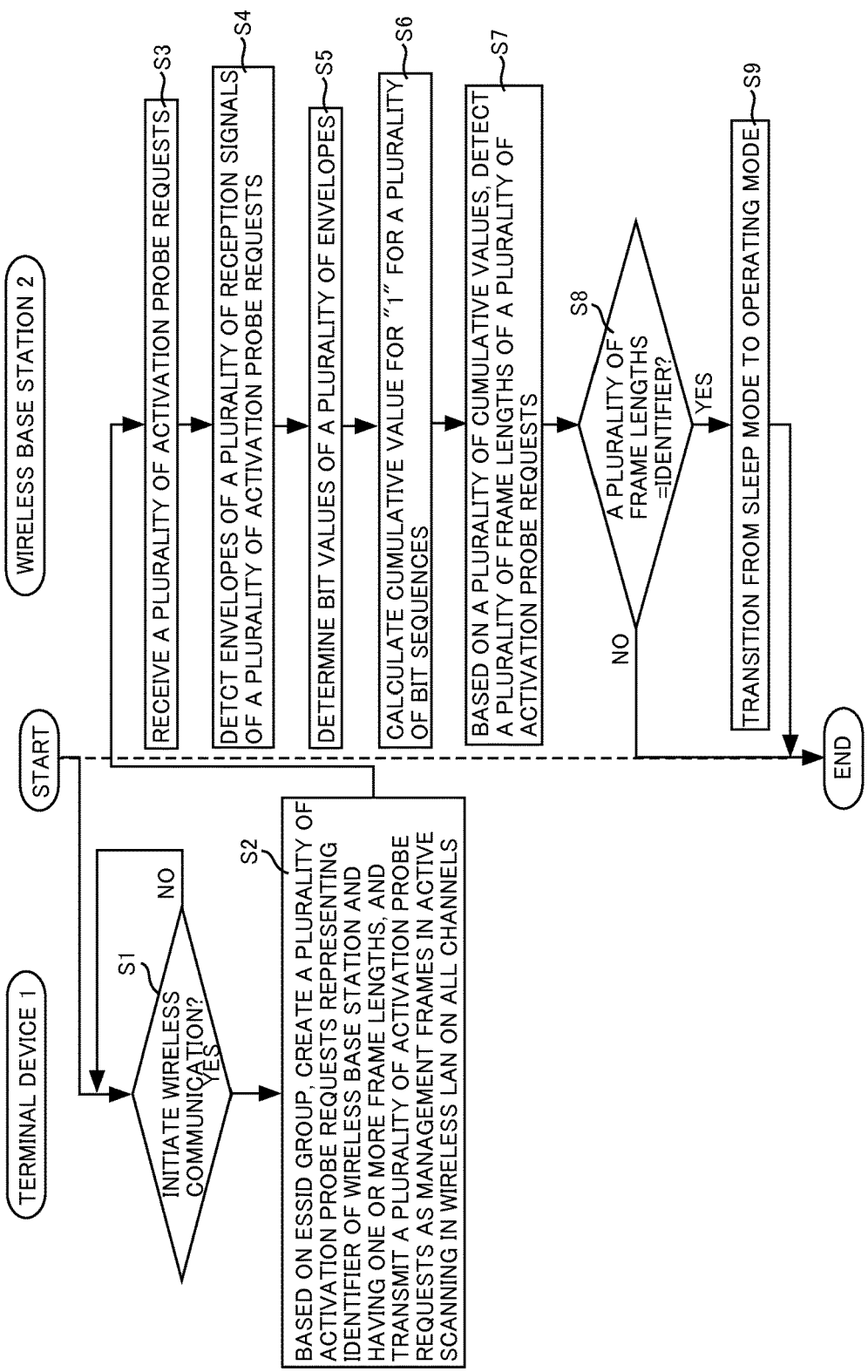
FIG. 9 is a flow chart illustrating how the wireless communication system of FIG. 1 is operated according to preferred embodiment 1.

FIG. 9 is a flow chart illustrating how the wireless communication system 10 of FIG. 1 is operated according to preferred embodiment 1.

FIG. 9 illustrates how the wireless communication system 10 is operated in the context of an example where the ESSID group is represented by dummy ESSID1=abcd (4 bytes), ESSID2=abcdefgh (8 bytes) and dummy ESSID3=ab (2 bytes). It is supposed that the wireless base station 2 receives a plurality of activation probe requests on channel Ch2.

Referring to FIG. 9, when the operation starts, the frame length modulation signal generator 12 of the terminal device 1 determines whether it has received the instruction signal CMS1 from the host system 13 to determine whether it starts wireless communication (step S1). In this case, when the frame length modulation signal generator 12 has received the instruction signal CMS1 from the host system 13, it determines that it starts wireless communication, and, when it has not received the instruction signal CMS1 from the host system 13, it determines that it does not start wireless communication.

If it is determined at step S1 that a wireless communication is started, the host system 13 refers to the conversion table TBL1 and converts dummy ESSID1=abcd (4 bytes), ESSID2=abcdefgh (8 bytes) and dummy ESSID3=ab (2 bytes) to the frame lengths of 232 µs, 264 µs and 216 µs, respectively, and outputs the converted frame lengths of 232 µs, 264 µs and 216 µs to the frame length modulation signal generator 12.

When the frame length modulation signal generator 12 has received the frame lengths of 232 µs, 264 µs and 216 µs, it generates a plurality of activation probe requests PRQD4 to PRQD6 having the frame lengths of 232 µs, 264 µs and 216 µs, respectively, and transmits the generated plurality of activation probe requests PRQD4 to PRQD6 as management frames in active scanning in a wireless LAN on all channels Ch1 to Ch14 (step S2).

In this case, the plurality of activation probe requests PRQD4 to PRQD6 are transmitted by the method illustrated in FIG. 8(a) or the method illustrated in FIG. 8(b).

Then, after step S2, the wake-up signal receiver 23 of the wireless base station 2 receives the plurality of activation probe requests PRQD4 to PRQD6 via the antenna 21 and switching device 22 on the channel Ch2 of the channels Ch1 to Ch14 (step S3).

Then, the BPF 231 of the wake-up signal receiver 23 outputs those portions having the frequency of the channel 2 of the reception radio waves of the plurality of activation probe requests PRQD4 to PRQD6 to the envelope detector 232.

Then, the envelope detector 232 detects the plurality of reception radio waves corresponding to the plurality of activation probe requests PRQD4 to PRQD6 (step S4), and outputs the plurality of detected signals to the bit determiner 233.

Thereafter, the bit determiner 233 determines the value of a bit of each of the plurality of detected signals at a certain interval (step S5) to generate a plurality of bit sequences. Then, the bit determiner 233 outputs the generated plurality of bit sequences to the frame length detector 234.

The frame length detector 234 calculates the cumulative value for "1" for a plurality of bit sequences (step S6), and detects the plurality of frame lengths of the plurality of activation probe requests based on the plurality of cumulative values (step S7). In this case, the frame length detector 234 performs on the plurality of cumulative values the process of multiplying one cumulative value by a certain interval in bit determination to determine a frame length, thereby detecting the plurality of frame lengths of 232 µs, 264 µs and 216 µs. Then, the frame length detector 234 outputs the detected plurality of frame lengths to the ID identification device 235.

The ID identification device 235 receives the plurality of frame lengths and determines whether the received plurality of frame lengths match the identifier of the wireless base station 2 (step S8).

If it is determined at step S8 that the plurality of frame lengths do not match the identifier of the wireless base station 2, the operation ends.

On the other hand, if it is determined at step S8 that the plurality of frame lengths match the identifier of the wireless base station 2, the ID identification device 235 generates the activation signal and outputs it to the host system 243, and, in response to the activation signal, the host system 243 transitions from sleep mode to operating mode. Then, the host system 243 outputs the command signal COM2 to the wireless communication module 241 and wire communication module 242, and, in response to the command signal COM2, the wireless communication module 241 and wire communication module 242 transition from sleep mode to operating mode. Thus, the wireless base station 2 transitions from sleep mode to operating mode (step S9). Then, the operation ends.

Thus, at step S2, the terminal device 1 transmits a plurality of activation probe requests on all channels Ch1 to Ch14. Thus, regardless of which of channels Ch1 to Ch14 is used by the wireless base station 2, the wireless base station 2 can receive a plurality of activation probe requests.

Further, at step S2, a plurality of activation probe requests are transmitted as management frames in active scanning in a wireless LAN. Thus, even when the terminal device 1 cannot transmit radio frames, it can cause the wireless base station 2 to which connection is being made to transition to operating mode. Further, it is possible to cause the wireless base station 2 to which connection is being made to transition to operating mode without changing the configuration of the terminal device 1.

Further, the wireless base station 2 transitions from sleep mode to operating mode when the plurality of frame lengths match the identifier of its own ("YES" at step S8 and step S9).

Thus, it is possible to cause a wireless base station 2 to transition to operating mode in an accurate manner. That is, if an identifier of the wireless base station 2 is represented by one frame length, the wireless base station 2 receives from the terminal device 1 one activation probe request having one frame length and detects the frame length of the one activation probe request.

However, if the frame length of an activation probe request changes dues to wireless communication, the wireless base station 2 cannot detect the correct frame length of the activation probe request, and therefore the wireless base station 2 cannot transition to operating mode.

In preferred embodiment 1, the wireless base station 2 transitions to operating mode when it has detected the plurality of frame lengths of a plurality of activation probe requests, and therefore it is possible to cause the wireless base station 2 to transition to operating mode in an accurate manner. That is, in preferred embodiment 1, not only one frame length, but a plurality of frame lengths must be detected to cause the wireless base station 2 to transition to operating mode, thereby causing the wireless base station 2 to transition to operating mode in an accurate manner.

If a plurality of activation probe requests are transmitted by the method illustrated in FIG. 8(*a*), the wireless base station 2 performs steps S3 to S8 two or more times. Then, when the wireless base station 2 determines two or more times (i.e. a plurality of times) that a plurality of frame lengths match the identifier of the wireless base station 2, it transitions to operating mode.

This improves the reliability with which a wireless base station 2 transitions to operating mode.

Further, if a plurality of activation probe requests are transmitted by the method illustrated in FIG. 8(*b*), the wireless base station 2 ensures that, only when there is a change in frame length, the frame length of the activation probe request received at this moment is relevant in connection with the identifier of the wireless base station 2, and ignores the frame lengths of the activation probe requests received when there is no change in frame length. That is, when the wireless base station 2 detects a frame length that is different from the preceding frame length detected, it regards the detected frame length as one of the plurality of frame lengths representing the identifier of its own. Thus, the wireless base station 2 can swiftly transition to operating mode.

Preferred Embodiment 2

Figure 10:
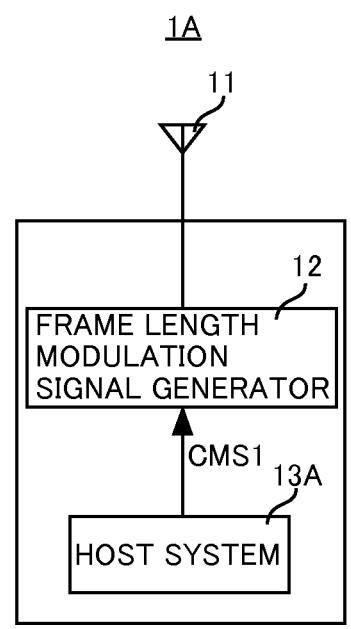
FIG. 10 is a schematic diagram of a configuration of the terminal device of FIG. 1 according to preferred embodiment 2.

FIG. 10 is a schematic diagram of a configuration of the terminal device 1 of FIG. 1 according to preferred embodiment 2. In preferred embodiment 2, the terminal device 1 is constituted by a terminal device 1A shown in FIG. 10.

Referring to FIG. 10, the terminal device 1A is the same as the terminal device 1 except that the host system 13 of the terminal device 1 of FIG. 2 is replaced by a host system 13A.

The host system 13A holds in advance an ESSID group (composed of a plurality of network identifiers that some of which are dummy ESSIDs) representing an identifier of the wireless base station that is intended to transition to operating mode.

Then, when causing a wireless base station to transition to operating mode, the host system 13A determines a plurality of frame lengths based on the ESSID group in the manner described below so that one or more differential frame lengths represent an identifier of the wireless base station, and outputs the determined plurality of frame lengths to the frame length modulation signal generator 12.

Otherwise, the host system 13A performs the same functions as the host system 13.

Figure 11:
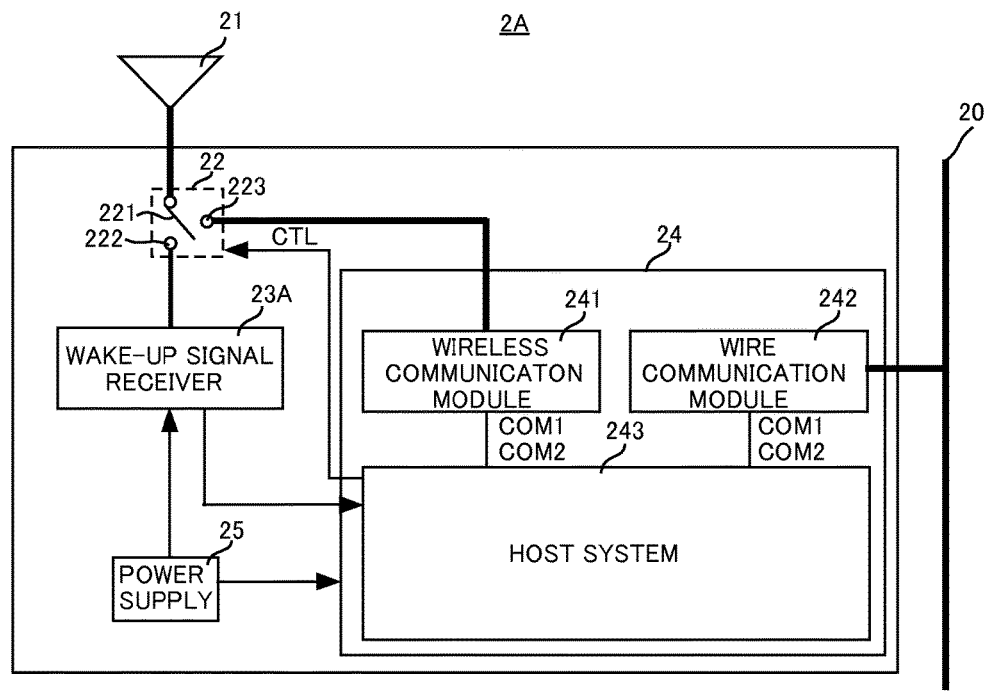
FIG. 11 is a schematic diagram of a configuration of the wireless base station of FIG. 1 according to preferred embodiment 2.

FIG. 11 is a schematic diagram of a configuration of the wireless base station 2 of FIG. 1 according to preferred embodiment 2.

In preferred embodiment 2, the wireless base station 2 is constituted by a wireless base station 2A shown in FIG. 11. Referring to FIG. 11, the wireless base station 2A is the same as the wireless base station 2 except that the wake-up signal receiver 23 of the wireless base station 2 of FIG. 3 is replaced by a wake-up signal receiver 23A.

The wake-up signal receiver 23A receives 100 µW power from the power supply 25 and is driven by the received power.

Further, when the main device 24 is in sleep mode, the wake-up signal receiver 23A is connected to the antenna 21 via the switching device 22. Then, when the wake-up signal receiver 23A has received the plurality of activation probe requests PRQD1 to PRQDn from the terminal device 1A via the antenna 21 on one of all channels Ch1 to Ch14, it detects one or more differential frame lengths based on the plurality of frame lengths of the plurality of activation probe requests PRQD1 to PRQDn that have been received, and determines whether the detected one or more differential frame lengths match the identifier of the wireless base station 2A. When the wake-up signal receiver 23A determines that the one or more differential frame lengths match the identifier of the wireless base station 2A, it generates the activation signal and outputs the generated activation signal to the main device 24.

Otherwise, the wake-up signal receiver 23A performs the same functions as the wake-up signal receiver 23.

The wake-up signal receiver 23A only has the function of receiving a plurality of activation probe requests PRQD1 to PRQDn for waking up a wireless base station 2A, and does not have the function of transmitting radio frames in a wireless LAN.

Figure 12:
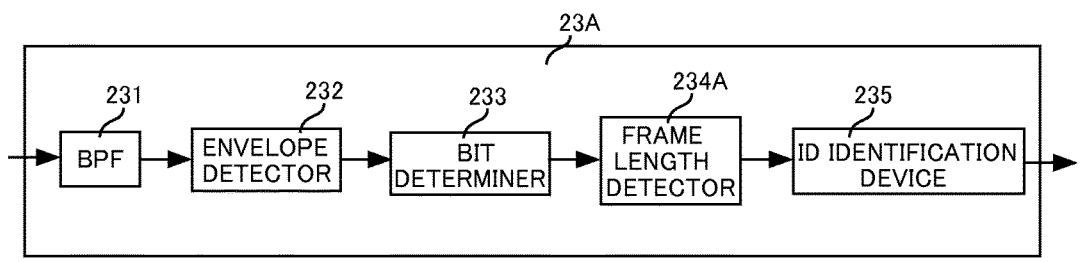
FIG. 12 is a schematic diagram of the wake-up signal receiver of FIG. 11.

FIG. 12 is a schematic diagram of the wake-up signal receiver 23A of FIG. 11.

Referring to FIG. 12, the wake-up signal receiver 23A is the same as the wake-up signal receiver 23 except that the frame length detector 234 of the wake-up signal receiver 23 of FIG. 4 is replaced by a frame length detector 234A and the ID identification device 235 is replaced by an ID identification device 235A.

When the frame length detector 234A receives a plurality of bit sequences from the bit determiner 233, it detects a plurality of frame lengths in the same manner as the frame length detector 234. Then, in the manner described below, the frame length detector 234A detects a plurality of differential frame lengths based on the plurality of frame lengths and outputs the detected plurality of differential frame lengths to the ID identification device 235A.

When the ID identification device 235A receives one or more differential frame lengths from the frame length detector 234A, it determines whether the one or more differential frame lengths match an identifier of the wireless base station 2A. If the one or more differential frame lengths match the identifier of the wireless base station 2A, the ID identification device 235A generates the activation signal and outputs it to the host system 243. If the one or more differential frame lengths do not match the identifier of the wireless base station 2A, the ID identification device 235A discards the one or more differential frame lengths.

Figures 13, 14:
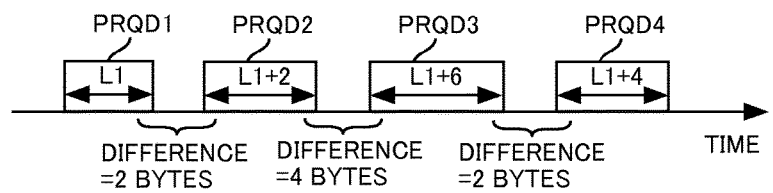
FIG. 13 illustrates a method of representing an identifier of the wireless base station using differential frame lengths.
FIG. 14 is a conversion table of the number of characters of an ESSID and differential frame length.

FIG. 13 illustrates a method of representing an identifier of the wireless base station using differential frame lengths. In FIG. 13, a differential frame length is represented by a number of bytes.

Referring to FIG. 13, if an identifier of the wireless base station 2A is represented by an ESSID group (i.e. dummy ESSID4=2 bytes, dummy ESSID5=4 bytes, ESSID6=2 bytes), the host system 13A of the terminal device 1A determines the frame length of L1, the frame length of L1+2 bytes, the frame length of L1+6 bytes and the frame length of L1+4 bytes, and outputs the frame length of L1, the frame length of L1+2 bytes, the frame length of L1+6 bytes and the frame length of L1+4 bytes that have been determined to the frame length modulation signal generator 12.

Then, the frame length modulation signal generator 12 successively transmits an activation probe request PRQD1 having the frame length of L1, an activation probe request PRQD2 having the frame length of L1+2 bytes, an activation probe request PRQD3 having the frame length of L1+6 bytes and an activation probe request PRQD4 having the frame length of L1+4 bytes.

As a result, the differential frame length between the activation probe request PRQD1 and the activation probe request PRQD2 is |L1−(L1+2)|=2 bytes, the differential frame length between the activation probe request PRQD2 and the activation probe request PRQD3 is |L1+2−(L1+6)|=4 bytes, and the differential frame length for the activation probe request PRQD3 and the activation probe request PRQD4 is |L1+6−(L1+4)|=2 bytes.

Thus, an identifier of the wireless base station 2A may be represented by a plurality of differential frame lengths (i.e. 2 bytes, 4 bytes and 2 bytes).

Thus, a differential frame length is the absolute value of the difference between the two frame lengths of two activation probe requests.

In the example shown in FIG. 13, the differential frame length relative to the preceding activation probe request represents an identifier of the wireless base station 2A; alternatively, in preferred embodiment 2, one activation probe request that serves as a reference frame is determined and a plurality of differential frame lengths relative to the frame length of the one activation probe request that has been determined may represent an identifier of the wireless base station 2A. For example, if the activation probe request PRQD1 is the reference frame, an identifier of the wireless base station 2A is represented by 2 bytes, 6 bytes, and 4 bytes, and the identifier of the wireless base station 2A is 264.

Alternatively, in preferred embodiment 2, a random frame length may be selected from a plurality of frame lengths, and the difference between the selected random frame length and a plurality of frame lengths may be calculated to determine a plurality of differential frame lengths.

In preferred embodiment 2, an identifier of the wireless base station 2A may be represented by one differential frame length. If an identifier of the wireless base station 2A is represented by one differential frame length, the wireless base station 2A receives two activation probe requests and detects the two frame lengths of the received two activation probe requests. Then, based on the detected two frame lengths, the wireless base station 2A detects one differential frame length, and, when the detected differential frame length matches the identifier of its own, transitions to operating mode.

Thus, even if an identifier of the wireless base station 2A is represented by one differential frame length, the wireless base station 2A detects two frame lengths, which complies with the spirit of the present invention which requires that the wireless base station 2A transition to operating mode under the condition that a plurality of frame lengths are detected.

Thus, according to preferred embodiment 2, an identifier of the wireless base station 2A is represented by one or more differential frame lengths.

FIG. 14 is a conversion table of the number of characters of an ESSID and differential frame length. Referring to FIG. 14, the conversion table TBL2 contains numbers of characters of ESSIDs and differential frame lengths. The numbers of characters of ESSIDs are associated with differential frame lengths.

The differential frame length ΔL of 0 μs is associated with the number of characters of an ESSID=0 bytes, the differential frame length ΔL of 8 μs is associated with the number of characters of an ESSID=1 bytes, the differential frame length ΔL of 16 μs is associated with the number of characters of an ESSID=2 bytes, and other differential frame lengths are associated with numbers of characters in a similar manner, and, the differential frame length ΔL of 248 μs is associated with the number of characters of an ESSID=31 bytes, and the differential frame length ΔL of 256 μs is associated with the number of characters of an ESSID=32 bytes.

The host system 13A of the terminal device 1A holds the conversion table TBL2.

If the ESSID group is made up of [dummy ESSID1=1 byte, dummy ESSID2=5 bytes, ESSID3=8 bytes], the host system 13A refers to the conversion table TBL2 and, based on the ESSID group which is [dummy ESSID1=1 byte, dummy ESSID2=5 bytes, ESSID3=8 bytes], determines the frame length of L1, the frame length of L1+8 μs, the frame length of L1+48 μs and the frame length of L1+112 μs.

In this case, a differential frame length is the differential frame length relative to the preceding frame length.

The host system 13A determines a plurality of frame lengths in the same manner if the ESSID group is made of ESSIDs other than [dummy ESSID1=1 byte, dummy ESSID2=5 bytes, ESSID3=8 bytes].

Figure 15:
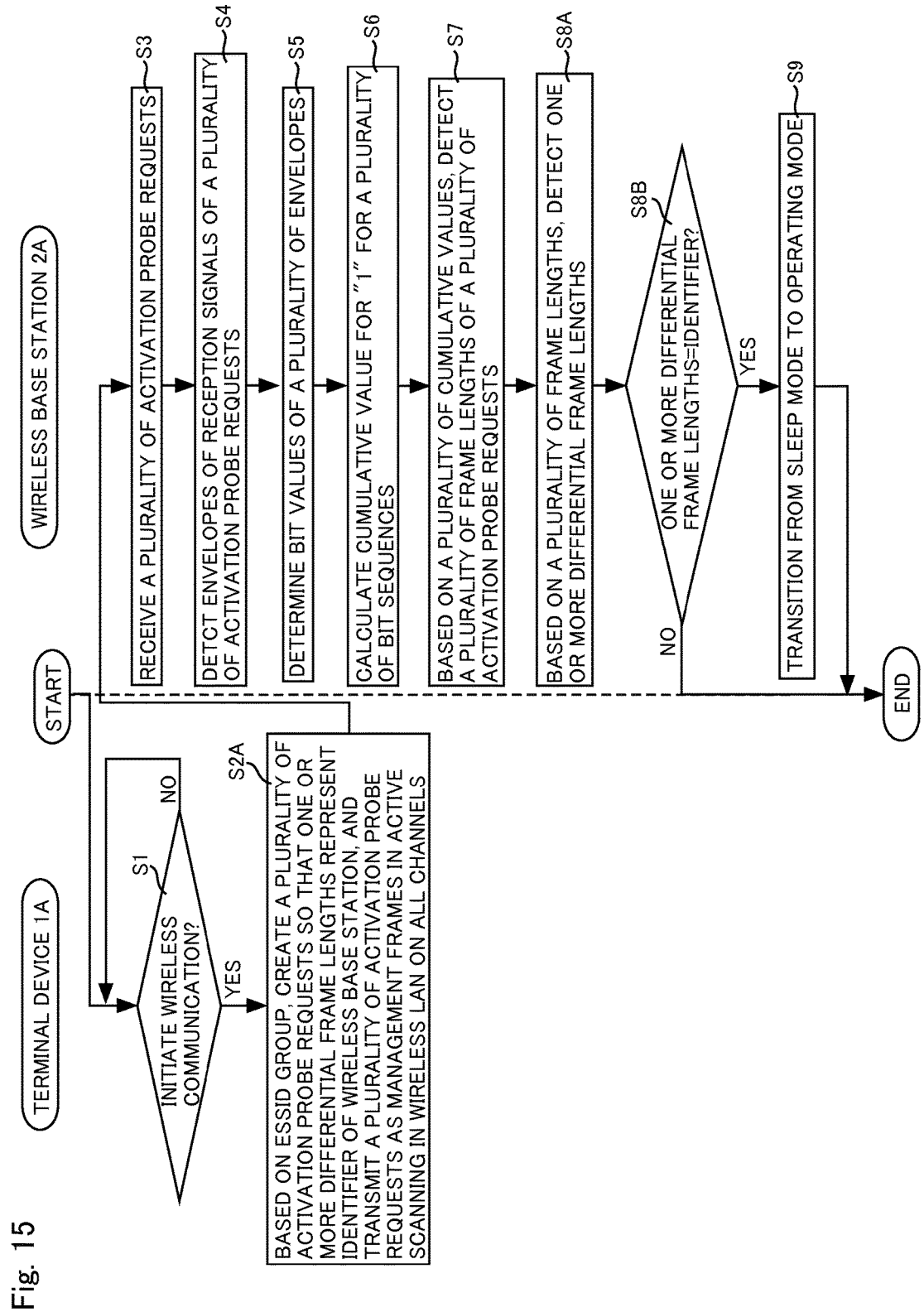
FIG. 15 is a flow chart illustrating how the wireless communication system of FIG. 1 is operated according to preferred embodiment 2.

FIG. 15 is a flow chart illustrating how the wireless communication system 10 of FIG. 1 is operated according to preferred embodiment 2.

FIG. 15 illustrates the operation of the wireless communication system 10 in an example where the ESSID group is made up of [dummy ESSID1=1 byte, dummy ESSID2=5 bytes, ESSID3=8 bytes].

The flow chart of FIG. 15 is the same as the flow chart of FIG. 9 except that step S2 of the flow chart of FIG. 9 is replaced by step S2A and step S8 is replaced by steps S8A and S8B.

Referring to FIG. 15, when the operation starts, step S1, described above, is performed.

Then, based on the ESSID group, the terminal device 1A creates a plurality of activation probe requests so that one or more differential frame lengths represent an identifier of the wireless base station 2A, and transmits the plurality of activation probe requests as management frames in active scanning in a wireless LAN on all channels (step S2A).

More specifically, based on the ESSID group which is [dummy ESSID1=1 byte, dummy ESSID2=5 bytes, ESSID3=8 bytes], the host system 13A of the terminal device 1A determines the frame length of L1, the frame length of L1+8 μs, the frame length of L1+48 μs and the frame length of L1+112 μs, and outputs the determined plurality of frame lengths L1, L1+8 μs, L1+48 μs and L1+112 μs to the frame length modulation signal generator 12. Then, based on the plurality of frame lengths L1, L1+8 μs, L1+48 μs and L1+112 μs, the frame length modulation signal generator 12 generates a plurality of activation probe requests, and transmits the generated plurality of activation probe requests via the antenna 11 on all channels. In this case, the terminal device 1A transmits the plurality of activation probe requests by the method illustrated in FIG. 8(a) or the method illustrated in FIG. 8(b).

Thereafter, steps S3 to S7 described above are sequentially performed. Then, after step S7, based on the plurality of frame lengths, the frame length detector 234A of the wireless base station 2A detects one or more differential frame lengths (i.e. 8 μs, 40 μs and 64 μs) (step S8A).

The ID identification device 235A receives the one or more differential frame lengths from the frame length detector 234A, and determines whether the received one or more differential frame lengths match an identifier of the wireless base station 2A (step S8B).

Then, if it is determined at step S8B that the one or more differential frame lengths match the identifier of the wireless base station 2A, step S9, described above, is performed.

On the other hand, if the one or more differential frame lengths do not match the identifier of the wireless base station 2A, the operation ends.

Thus, the terminal device 1A generates a plurality of activation probe requests so that one or more differential frame lengths represent an identifier of the wireless base station 2A and transmits them on all channels (see step S2A). Further, based on the reception radio waves of the plurality of activation probe requests, the wireless base station 2A detects the plurality of frame lengths of a plurality of activation probe requests, and, based on the detected plurality of frame lengths, detects one or more differential frame lengths (see steps S3 to S7 and S8A). Then, the wireless base station 2A determines whether the one or more differential frame lengths match the identifier of its own and, if the one or more differential frame lengths match the identifier of its own, transitions to operating mode (see steps S8B and S9).

Thus, when the plurality of frame lengths of the plurality of activation probe requests change due to wireless communication, the plurality of frame lengths change in a similar manner, and therefore one or more differential frame lengths are accurately detected in the wireless base station 2A. As a result, the wireless base station 2A can be activated in an accurate manner.

As described above, if an identifier of the wireless base station 2A is represented by three differential frame lengths, the terminal device 1A transmits four activation probe requests. Thus, if an identifier of the wireless base station 2A is represented by j (j is an integer not smaller than 1) differential frame lengths, the terminal device 1A transmits j+1 activation probe requests.

Figure 16:
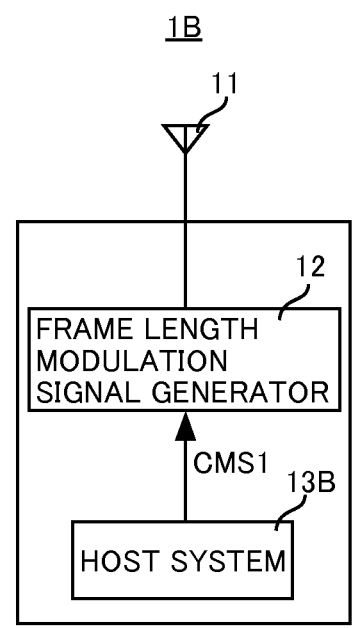
FIG. 16 is a schematic diagram of another configuration of the terminal device of FIG. 1 according to preferred embodiment 2.

FIG. 16 is a schematic diagram of another configuration of the terminal device 1 of FIG. 1 according to preferred embodiment 2.

In preferred embodiment 2, the terminal device 1 may be constituted by a terminal device 1B shown in FIG. 16.

Referring to FIG. 16, the terminal device 1B is the same as the terminal device 1 except that the host system 13 of the terminal device 1 of FIG. 2 is replaced by a host system 13B.

The host system 13B holds in advance an ESSID group (composed of a plurality of network identifiers that some of which are dummy ESSIDs) that represent an identifier of the wireless base station that is intended to transition to operating mode.

Then, when causing the wireless base station to transition to operating mode, the host system 13B determines, in the manner described below, a plurality of frame lengths so that one or more differential frame lengths/reference values represent an identifier of the wireless base station based on the ESSID group (composed of a plurality of network identifiers that some of which are dummy ESSIDs), and outputs the determined plurality of frame lengths to the frame length modulation signal generator 12.

Otherwise, the host system 13B performs the same functions as the host system 13.

Figure 17:
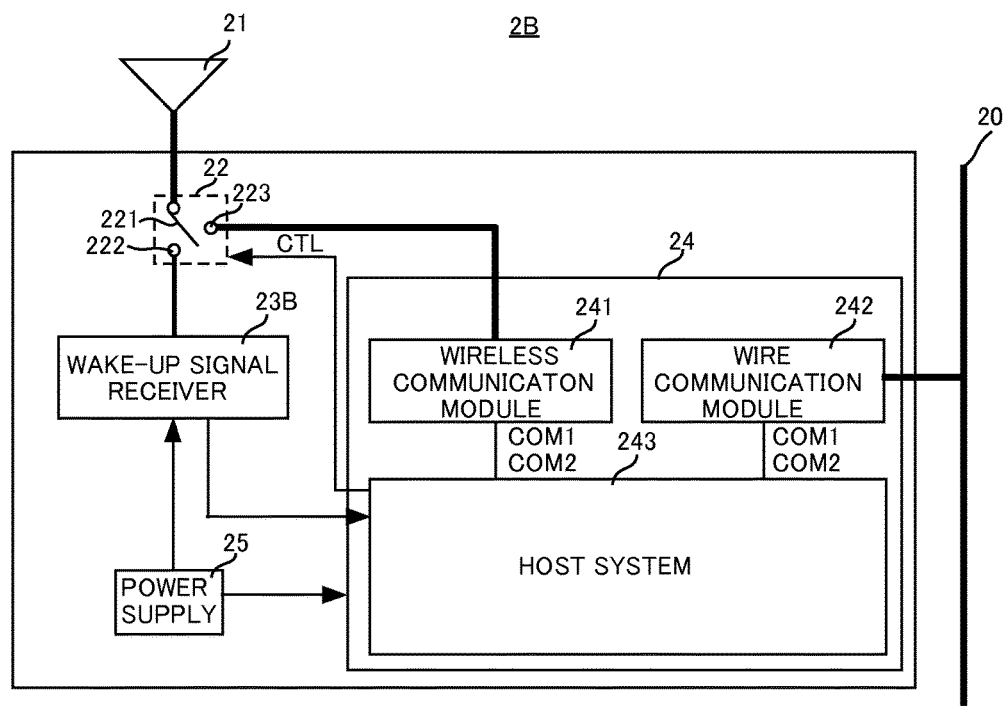
FIG. 17 is a schematic diagram of another configuration of the wireless base station of FIG. 1 according to preferred embodiment 2.

FIG. 17 is a schematic diagram of another configuration of the wireless base station 2 of FIG. 1 according to preferred embodiment 2.

In preferred embodiment 2, the wireless base station 2 may be constituted by a wireless base station 2B shown in FIG. 17. Referring to FIG. 17, the wireless base station 2B is the same as the wireless base station 2 except that the wake-up signal receiver 23 of the wireless base station 2 of FIG. 3 is replaced by a wake-up signal receiver 23B.

The wake-up signal receiver 23B receives 100 μW power from the power supply 25 and is driven by the received power.

Further, when the main device 24 is in sleep mode, the wake-up signal receiver 23B is connected to the antenna 21 via the switching device 22. Then, when upon receiving a plurality of activation probe requests PRQD1 to PRQDn from the terminal device 1B via the antenna 21 on one of all channels Ch1 to Ch14, the wake-up signal receiver 23B detects the plurality of differential frame lengths for the plurality of frame lengths of the received plurality of activation probe requests PRQD1 to PRQDn, and, based on the detected plurality of differential frame lengths, detects one or more differential frame lengths/reference values. Thereafter, the wake-up signal receiver 23B determines whether the one or more differential frame lengths/reference values match an identifier of the wireless base station 2B. If the wake-up signal receiver 23B determines that the one or more differential frame lengths/reference values match the identifier of the wireless base station 2B, it generates the activation signal and outputs the generated activation signal to the main device 24. If it is determined that the one or more differential frame lengths/reference values do not match the identifier of the wireless base station 2B, the wake-up signal receiver 23B discards the one or more differential frame lengths/reference values.

Otherwise, the wake-up signal receiver 23B performs the same functions as the wake-up signal receiver 23.

The wake-up signal receiver 23B has only the function of receiving a plurality of activation probe requests PRQD1 to PRQDn for waking up the wireless base station 2B, and does not have the function of transmitting radio frames in a wireless LAN.

Figure 18:
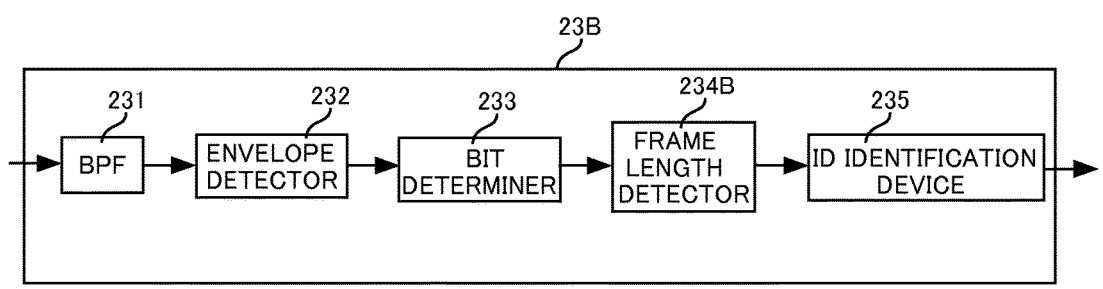
FIG. 18 is a schematic diagram of the wake-up signal receiver of FIG. 17.

FIG. 18 is a schematic diagram of the wake-up signal receiver 23B of FIG. 17.

Referring to FIG. 18, the wake-up signal receiver 23B is the same as the wake-up signal receiver 23 except that the frame length detector 234 of the wake-up signal receiver 23 of FIG. 4 is replaced by a frame length detector 234B and the ID identification device 235 is replaced by an ID identification device 235B.

When the frame length detector 234B receives a plurality of bit sequences from the bit determiner 233, it detects the plurality differential frame lengths in the same manner as the frame length detector 234A. Then, the frame length detector 234B detects one or more differential frame lengths/reference values based on the plurality of differential frame lengths in the manner described below, and outputs the detected one or more differential frame lengths/reference values to the ID identification device 235B.

When the ID identification device 235B receives the one or more differential frame lengths/reference values from the frame length detector 234B, it determines whether the received one or more differential frame lengths/reference values match the identifier of the wireless base station 2B. If the one or more differential frame lengths/reference values match the identifier of the wireless base station 2B, the ID identification device 235B generates the activation signal and outputs it to the host system 243. On the other hand, if the one or more differential frame lengths/reference values do not match the identifier of the wireless base station 2B, the ID identification device 235B discards the one or more differential frame lengths/reference values.

Figure 19:
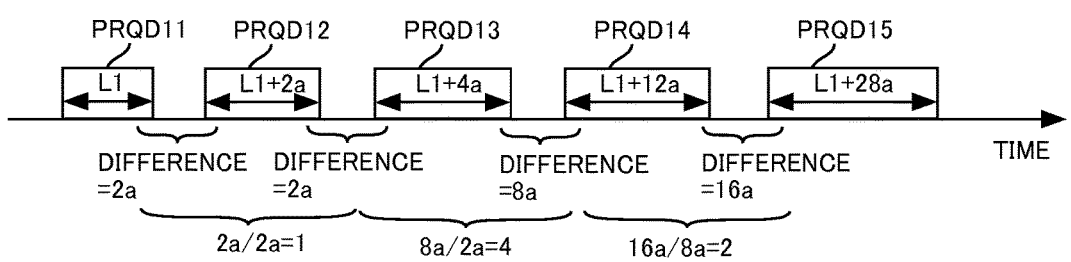
FIG. 19 illustrates a method of representing an identifier of the wireless base station using differential frame lengths/reference values.

FIG. 19 illustrates a method of representing an identifier of the wireless base station using differential frame lengths/reference values. In FIG. 19, a differential frame length is represented by a number of bytes.

Referring to FIG. 19, if an identifier of the wireless base station 2B is represented by an ESSID group (i.e. dummy ESSID1=1 byte, dummy ESSID2=4 bytes, ESSID3=2 bytes), the host system 13B of the terminal device 1B determines the frame length of L1, the frame length of L1+2a, the frame length of L1+4a, the frame length of L1+12a and the frame length of L1+28a, and outputs the frame length of L1, the frame length of L1+2a, the frame length of L1+4a, the frame length of L1+12a and the frame length of L1+28a that have been determined to the frame length modulation signal generator 12.

Then, the frame length modulation signal generator 12 sequentially transmits an activation probe request PRQD11 having the frame length of L1, an activation probe request PRQD12 having the frame length of L1+2a, an activation probe request PRQD13 having the frame length of L1+4a, an activation probe request PRQD14 having the frame length of L1+12a and an activation probe request PRQD15 having the frame length of L1+28a.

As a result, the differential frame length between the activation probe request PRQD11 and the activation probe request PRQD12 is |L1−(L1+2a)|=2a, the differential frame length between the activation probe request PRQD12 and the activation probe request PRQD13 is |L1+2a−(L1+4a)|=2a, the differential frame length between the activation probe request PRQD13 and the activation probe request PRQD14 is |L1+4a−(L1+12a)|=8a, and the differential frame length between the activation probe request PRQD14 and the activation probe request PRQD15 is |L1+12a−(L1+28a)|=16a.

Then, if the preceding differential frame length is a reference value, the differential frame length/reference value between the two differential frame lengths 2a and 2a is 2a/2a=1, the differential frame length/reference value between the two differential frame lengths 2a and 8a is 8a/2a=4, and the differential frame length/reference value between the two differential frame lengths 8a and 16a is 16a/8a=2.

Thus, an identifier of the wireless base station 2B can be represented by a plurality of differential frame lengths/reference values (i.e. 1 byte, 4 bytes and 2 bytes).

In the example of FIG. 19, the preceding differential frame length is a reference value; alternatively, in preferred embodiment 2, a random one of a plurality of differential frame lengths may be determined as a reference value, and a plurality of differential frame lengths divided by the determined reference value, which means a plurality of differential frame lengths/reference values, may represent an identifier of the wireless base station 2B. For example, if the first differential frame length is a reference value, an identifier of the wireless base station 2B is represented by three numbers of characters, i.e. 1 byte, 4 bytes and 8 bytes, and the identifier of the wireless base station 2B is 148.

In preferred embodiment 2, an identifier of the wireless base station 2B may be represented by one differential frame length/reference value. If an identifier of the wireless base station 2B is represented by one differential frame length/reference value, the wireless base station 2B receives three activation probe requests and detects the three frame lengths of the received three activation probe requests. Then, based on the detected three frame lengths, the wireless base station 2B detects two differential frame lengths, and, based on the detected two differential frame lengths, detects one differential frame length/reference value, and, if the detected one differential frame length/reference value matches the identifier of its own, transitions to operating mode.

Thus, even if an identifier of the wireless base station 2B is represented by one differential frame length/reference value, the wireless base station 2B detects three frame lengths, and therefore this complies with the spirit of the present invention which requires that the wireless base station 2B transition to operating mode under the condition that a plurality of frame lengths are detected.

Thus, in preferred embodiment 2, an identifier of the wireless base station 2B is represented by one or more differential frame lengths/reference values.

FIG. 20 is a conversion table of the number of characters of an ESSID and differential frame length/reference value.

Referring to FIG. 20, the conversion table TBL3 contains numbers of characters of ESSIDs and differential frame lengths/reference values. The numbers of characters of ESSIDs are associated with the differential frame lengths/reference values.

The differential frame lengths/reference values composed of "0" to "32" are associated with the numbers of characters of ESSIDs of "0" to "32", respectively.

If an ESSID is represented by a number of characters of "0" to "32", the frame length is 32 bytes×8 μs=255 μs when the number of characters is "32" bytes, and the frame length is 0 bytes×8 μs=0 μs when the number of characters is "0" bytes, as described above.

As a result, the maximum differential frame length between two activation probe requests PRQDs is 256 μs−0 μs=256 μs, and the minimum differential frame length is obtained when the two frame lengths of two activation probe requests PRQDs are the same, and it is 0 μs.

Then, the maximum value of differential frame length/reference value is 256 μs/8 μs=32; the minimum value of differential frame length/reference value is produced when differential frame length=0, and it is 0.

In view of this, as shown in the conversion table TBL3, the differential frame lengths/reference values of "0" to "32" are assigned to the numbers of characters of ESSIDs of "0" to "32", respectively.

It should be noted that, in FIG. 19, differential frame length/reference value=0 cannot be used in a method that the differential frame length/reference value is calculated by using the preceding difference as a reference, because there is a case that differential frame length=0 is the reference value, and in such case the differential frame length/reference value is infinite.

However, in FIG. 19, differential frame length/reference value=0 can be used in a method that the differential frame length/reference value is calculated by fixing the reference value to one differential frame length. That is, if the reference value is fixed to a differential frame length composed of a value other than "0", differential frame length/reference value=0 can be used.

Accordingly, the conversion table TBL3 contains differential frame length/reference value=0.

The host system 13B of the terminal device 2B holds the conversion table TBL3. Then, the host system 13B of the terminal device 2B refers to the conversion table TBL3 and, based on the ESSID group, determines a plurality of frame lengths so that one or more differential frame lengths/reference values represent an identifier of the wireless base station 2B, and outputs the determined plurality of frame lengths to the frame length modulation signal generator 12.

Further, the ID identification device 235B of the wireless base station 2B determines whether the one or more differential frame lengths/reference values received from the frame length detector 234B match an identifier of the wireless base station 2B. If the one or more differential frame lengths/reference values match the identifier of the wireless base station 2B, the ID identification device 235B generates the activation signal and outputs it to the host system 243. On the other hand, if the one or more differential frame lengths/reference values do not match the identifier of the wireless base station 2B, the ID identification device 235B discards the one or more differential frame lengths/reference values.

Figure 21:
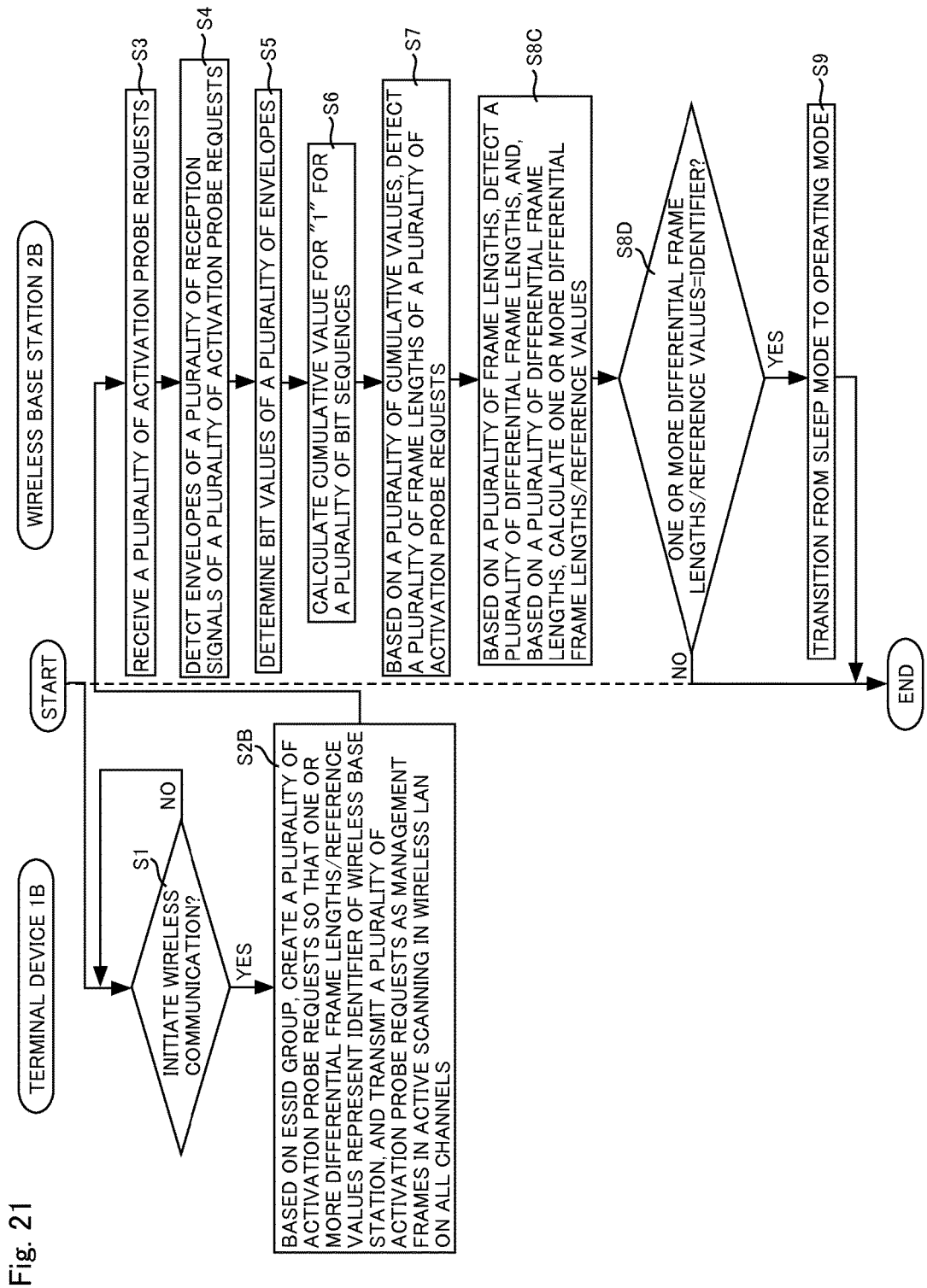
FIG. 21 is a flowchart illustrating another manner in which the wireless communication system of FIG. 1 is operated according to preferred embodiment 2.

FIG. 21 is a flow chart illustrating another operation of the wireless communication system 10 of FIG. 1 according to preferred embodiment 2.

FIG. 21 illustrates the operation of the wireless communication system 10 in an example where an identifier of the wireless base station 2B is represented by an ESSID group (i.e. dummy ESSID1=a (1 byte), dummy ESSID2=abcd (4 bytes) and ESSID3=ab (2 bytes).

The flow chart of FIG. 21 is the same as the flow chart of FIG. 9 except that step S2 of the flow chart of FIG. 9 is replaced by step S2B and step S8 is replaced by steps S8C and S8D.

Referring to FIG. 21, when the operation starts, step S1, described above, is performed. Then, based on the ESSID group, the terminal device 1B creates a plurality of activation probe requests PRQD11 to PRQD15 so that one or more differential frame lengths/reference values represent an identifier of the wireless base station 2B (i.e. 142), and transmits the plurality of activation probe requests PRQD11 to PRQD15 as management frames in active scanning in a wireless LAN on all channels (step S2B).

In this case, the frame length of the active probe request PRQD11 is L1, the frame length of the activation probe request PRQD12 is L1+16 μs, the frame length of the activation probe request PRQD13 is L1+32 μs, the frame length of the activation probe request PRQD14 is L1+96 μs, and the frame length of the activation probe request PRQD15 is L1+224 μs.

After step S2B, steps S3 to S7, described above, are sequentially performed. After step S7, based on the plurality of frame lengths, the frame length detector 234B of the wireless base station 2B detects a plurality of differential frame lengths, and, based on the detected plurality of differential frame lengths, calculates one or more differential frame lengths/reference values (step S8C).

In this case, the frame length detector 234B detects the frame length L1 of the active probe request PRQD11, the frame length L1+16 μs of the activation probe request PRQD12, the frame length L1+32 μs of the activation probe request PRQD13, the frame length L1+96 μs of the activation probe request PRQD14, and the frame length L1+224 μs of the activation probe request PRQD15.

Then, the frame length detector 234B detects the differential frame length=|L1−(L1+16 μs)|=16 μs, the differential frame length=|L1+16 μs−(L1+32 μs)|=16 μs, the differential frame length=|L1+32 μs−(L1+96 μs)|=64 μs, and the differential frame length=|L1+96 μs−(L1+224 μs)|=128 μs.

Then, the frame length detector 234B calculates differential frame length/reference value=16 μs/16 μs=1, differential frame length/reference value=64 μs/16 μs=4, and differential frame length/reference value=128 μs/64 μs=2.

When the frame length detector 234B has calculated one or more differential frame lengths/reference values, it outputs the calculated one or more differential frame lengths/reference values to the ID identification device 235B.

The ID identification device 235B receives the one or more differential frame lengths/reference values from the frame length detector 234B and determines whether the received one or more differential frame lengths/reference values match the identifier of the wireless base station 2B (step S8D).

If it is determined at step S8D that the one or more differential frame lengths/reference values match the identifier of the wireless base station 2B, step S9, described above, is performed. On the other hand, if it is determined at step S8D that the one or more differential frame lengths/reference values do not match the identifier of the wireless base station 2B, the operation ends.

In the flow chart of FIG. 21, a plurality of activation probe requests PRQD11 to PRQD15 are transmitted so that a plurality of differential frame lengths/reference values represent an identifier of the wireless base station 2B, and thus the differential frame length/reference value, which is the ratio of two differential frame lengths, is constant even when the frame lengths of the activation probe requests PRQD11 to PRQD15 change.

Thus, the wireless base station 2B can be accurately activated.

If an identifier of the wireless base station 2B is represented by three differential frame lengths/reference values, the terminal device 1B transmits five activation probe requests PRQD11 to PRQD15. Accordingly, if an identifier of the wireless base station 2B is represented by j differential frame lengths/reference values, the terminal device 1B transmits j+2 activation probe requests.

The other description of preferred embodiment 2 is the same as that of preferred embodiment 1.

Preferred Embodiment 3

Figure 22:
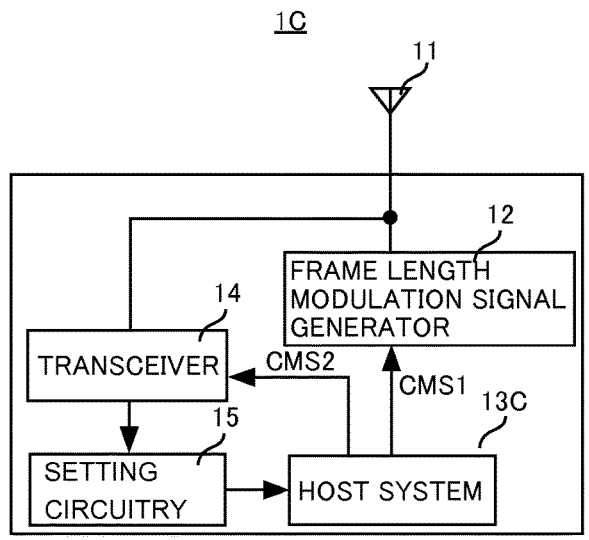
FIG. 22 is a schematic diagram of a configuration of the terminal device of FIG. 1 according to preferred embodiment 3.

FIG. 22 is a schematic diagram of a configuration of the terminal device 1 of FIG. 1 according to preferred embodiment 3. In preferred embodiment 3, the terminal device 1 is constituted by a terminal device 1C shown in FIG. 22.

Referring to FIG. 22, the terminal device 1C is the same as the terminal device 1 except that the host system 13 of the terminal device 1 of FIG. 2 is replaced by a host system 13C and a transceiver 14 and a setting circuitry 15 are added.

In the host system 13C, an ESSID group is set by the setting circuitry 15, and the host system 13C holds the ESSID group. Then, when the host system 13C initiates a wireless communication with a wireless base station, it determines a plurality of frame lengths of a plurality of activation probe requests PRQD1 and PRQDn in the same manner as one of the host systems 13, 13A and 13B, and outputs the determined plurality of frame lengths that have been decided on to the frame length modulation signal generator 12.

Further, when the host system 13C initiates a wireless communication with a wireless base station that is currently in operating mode, it generates an instruction signal CMS2 for instructing that a wireless communication is to be initiated with the wireless base station, and outputs the generated instruction signal CMS2 to the transceiver 14.

Otherwise, the host system 13C performs the same functions as the host system 13.

When the wireless base station is in operating mode, the transceiver 14 receives the instruction signal CMS2 from the host system 13, and, in response to the received instruction signal CMS2, generates a connection probe request PRQ as a management frame in active scanning in a wireless LAN and transmits the generated connection probe request PRQ via the antenna 11.

After the transceiver 14 has transmitted the connection probe request PRQ, it receives an encrypted ESSID group, which is produced by encrypting an ESSID group, from the wireless base station via the antenna 11, and outputs the received encrypted ESSID group to the setting circuitry 15.

The setting circuitry 15 holds a decryption key K_decry in advance. When the setting circuitry 15 has received an encrypted ESSID group from the transceiver 14, it decrypts the received encrypted ESSID group using the decryption key K_decry, and sets the decrypted ESSID group in the host system 13C.

Figure 23:
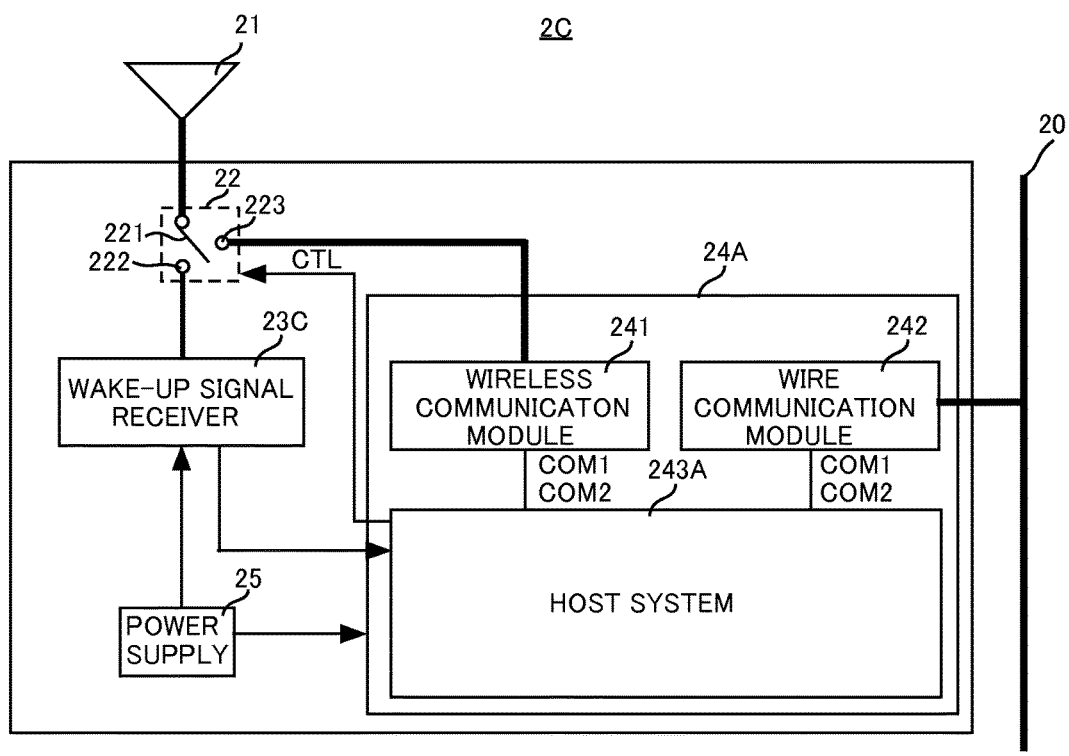
FIG. 23 is a schematic diagram of a configuration of the wireless base station of FIG. 1 according to preferred embodiment 3.

FIG. 23 is a schematic diagram of a configuration of the wireless base station 2 of FIG. 1 according to preferred embodiment 3. In preferred embodiment 3, the wireless base station 2 is constituted by a wireless base station 2C of FIG. 23.

Referring to FIG. 23, the wireless base station 2C is the same as the wireless base station 2 except that the wake-up signal receiver 23 of FIG. 3 is replaced by a wake-up signal receiver 23C and the main device 24 is replaced by a main device 24A.

The wake-up signal receiver 23C receives 100 μW power from the power supply 25 and is driven by the received power. The wake-up signal receiver 23C is connected to the antenna 21 via the switching device 22. In the wake-up signal receiver 23C, an identifier of the wireless base station 2C is set by the main device 24A.

The wake-up signal receiver 23C has the same configuration as one of the wake-up signal receiver 23 of FIG. 4, the wake-up signal receiver 23A of FIG. 12, and the wake-up signal receiver 23B of FIG. 18. That is, if the terminal device 1C is constituted by the terminal device 1, the wake-up signal receiver 23C has the same configuration as the wake-up signal receiver 23; if the terminal device 1C is constituted by the terminal device 1A, it has the same configuration as the wake-up signal receiver 23A; and, if the terminal device 1C is constituted by the terminal device 1B, it has the same configuration as the wake-up signal receiver 23B.

Then, the wake-up signal receiver 23C receives a plurality of activation probe requests PRQD1 to PRQDn via the antenna 21, and processes the received plurality of activation probe requests PRQD1 to PRQDn in the same manner as one of the wake-up signal receivers 23, 23A and 23B, and, if the plurality of frame lengths (or the one or more differential frame lengths or the one or more differential frame lengths/reference values) match the identifier of the wireless base station 2C, generates the activation signal and outputs it to the main device 24A.

The main device 24A receives 7 W power from the power supply 25 and is driven by the received power. The main device 24A is connected to the antenna 21 via the switching device 22. The main device 24A holds the encryption key K_encry in advance. The main device 24A receives the connection probe request PRQ from the terminal device 1C via the antenna 21, and, in response to the received connection probe request PRQ, determined an identifier of the wireless base station 2C (i.e. ESSID group), and sets the determined identifier (i.e. ESSID group) in the wake-up signal receiver 23C.

Further, the main device 24A encrypts the ESSID group which represents the identifier of the wireless base station 2C (i.e. a plurality of ESSIDs including some that are dummy ESSIDs) using the encryption key K_encry, and transmits the encrypted ESSID group to the terminal device 1C via the antenna 21.

Otherwise, the main device 24A performs the same functions as the main device 24.

The main device 24A is the same as the main device 24 except that the host system 243 of the main device 24 of FIG. 3 is replaced by a host system 243A.

The host system 243A holds the encryption key K_encry in advance. When the host system 243A receives the connection probe request PRQ from the terminal device 1C via the wireless communication module 241, determines an identifier of the wireless base station 2C (i.e. ESSID group) in response to the received connection probe request PRQ, and sets the determined identifier (i.e. ESSID group) in the wake-up signal receiver 23C.

Further, the host system 243A, using the encryption key K_encry, encrypts the ESSID group which represents the identifier of the wireless base station 2C (i.e. a plurality of ESSIDs including some that are dummy ESSIDs), and transmits the encrypted ESSID group to the terminal device 1C via the wireless communication module 241.

Otherwise, the host system 243A performs the same functions as the host system 243.

Figure 24:
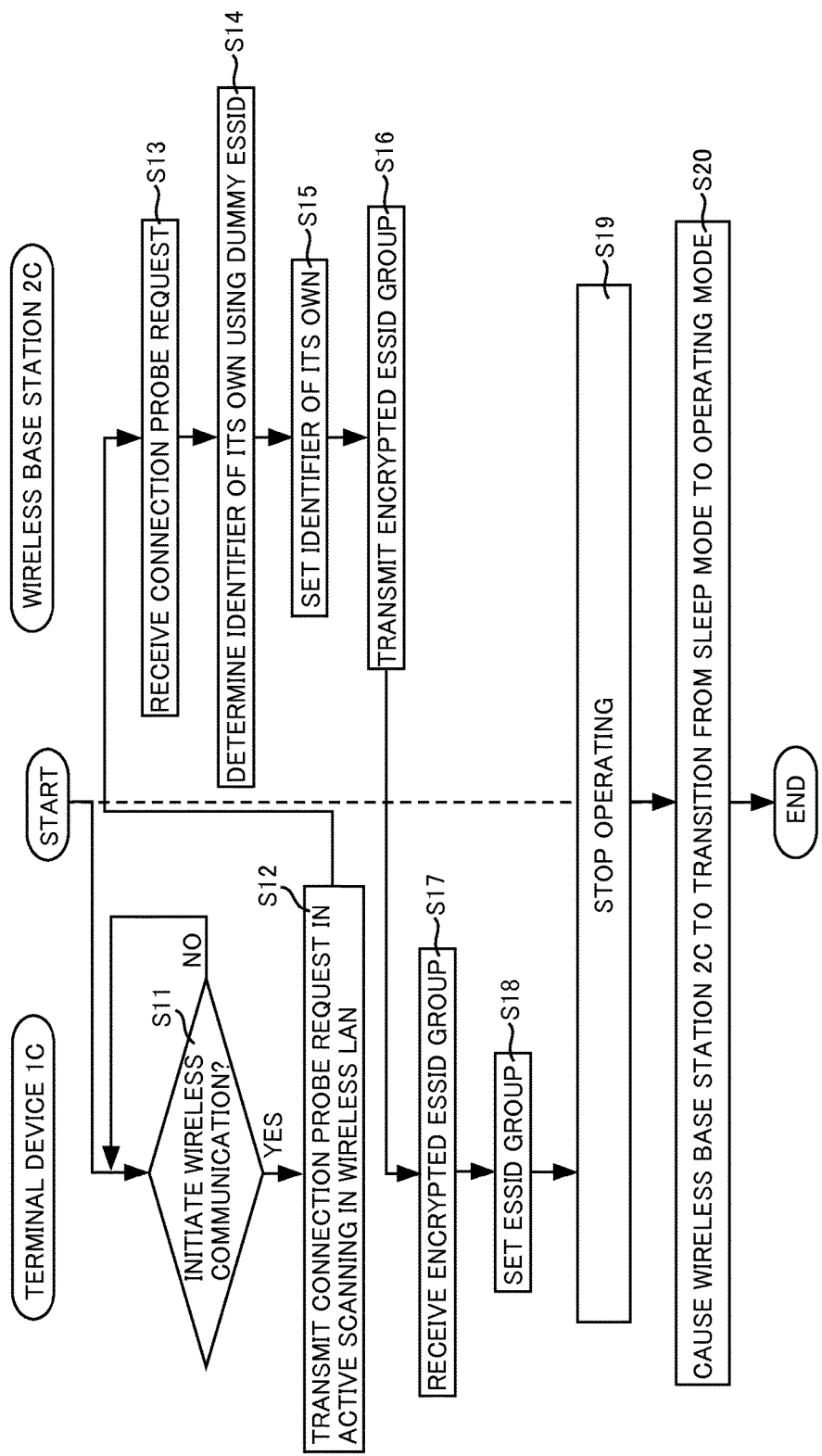
FIG. 24 is a flow chart illustrating how the wireless communication system of FIG. 1 is operated according to preferred embodiment 3.

FIG. 24 is a flow chart illustrating how the wireless communication system 10 of FIG. 1 is operated according to preferred embodiment 3.

host system 13C of the terminal device 1C, when initiating a wireless communication with a wireless base station 2C that is currently in operating mode (step S11), generates the instruction signal CMS2 and provides it to the transceiver 14.

In response to the instruction signal CMS2, the transceiver 14 generates a connection probe request PRQ, and transmits the generated connection probe request PRQ in active scanning in the wireless LAN (step S12).

Then, the wireless communication module 241 of the wireless base station 2C receives the connection probe request PRQ via the antenna 21 (step S13), and outputs the received connection probe request PRQ to the host system 243A.

In response to the connection probe request PRQ from the wireless communication module 241, the host system 243A determines an identifier of the wireless base station 2C using dummy ESSIDs (step S14). The host system 243A determines, for example, an identifier of the wireless base station 2C including dummy ESSID1=a, dummy ESSID2=abcdefghijk, dummy ESSID3=abcdefg, and ESSID4=abc.

Thereafter, the host system 243A sets, in the wake-up signal receiver 23C, the identifier of the wireless base station 2C (i.e. dummy ESSID1=a, dummy ESSID2=abcdefghijk, dummy ESSID3=abcdefg, and ESSID4=abc) (step S15).

Then, the host system 243A, using the encryption key K_encry, encrypts the ESSID group that represents the identifier of the wireless base station 2C (i.e. dummy ESSID1=a, dummy ESSID2=abcdefghijk, dummy ESSID3=abcdefg, and ESSID4=abc), and outputs the encrypted ESSID group to the wireless communication module 241, and the wireless communication module 241 transmits the encrypted ESSID group to the terminal device 1C (step S16).

The transceiver 14 of the terminal device 1C receives the encrypted ESSID group via the antenna 11 (step S17), and outputs the received encrypted ESSID group to the setting circuitry 15.

The setting circuitry 15 decrypts the encrypted ESSID group from the transceiver 14 using the decryption key K_decry, and sets the decrypted ESSID group (i.e. dummy ESSID1=a, dummy ESSID2=abcdefghijk, dummy ESSID3=abcdefg, and ESSID4=abc) in the host system 13C (step S18).

Then, the terminal device 1C and wireless base station 2C stop operating (step S19). That is, the terminal device 1C and wireless base station 2C transition from operating mode to sleep mode.

Thereafter, when the terminal device 1C initiates a wireless communication with the wireless base station 2C, it causes the wireless base station 2C to transition from sleep mode to operating mode (step S20). In this case, the operation at step S20 is performed in accordance with one of the flow chart of FIG. 9, the flow chart of FIG. 15 and the flow chart of FIG. 21.

Thus, the operation ends.

Thus, the terminal device 1C and wireless base station 2C automatically sets an ESSID group.

Accordingly, an ESSID group can be automatically set only by adding to an existing terminal device high-order software that is executed in a higher layer than the physical layer and MAC layer.

The other description of preferred embodiment 3 is the same as the description of preferred embodiments 1 and 2.

Preferred Embodiment 4

Figure 25:
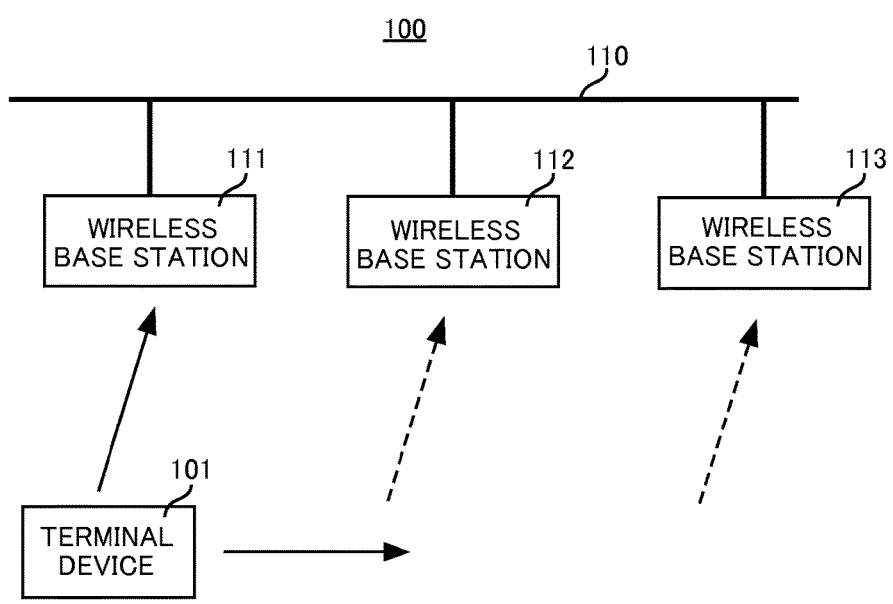
FIG. 25 is a schematic diagram of a wireless communication system according to preferred embodiment 4.

FIG. 25 is a schematic diagram of a wireless communication system according to preferred embodiment 4. Referring to FIG. 25, the wireless communication system 100 according to preferred embodiment 4 includes a terminal device 101 and wireless base stations 111 to 113.

The terminal device 101 has the same configuration as one of the above-described terminal devices 1, 1A, 1B and 1C, and, when initiating a wireless communication, transmits a plurality of activation probe requests PRQD1 to PRQDn having a plurality of frame lengths that represent an identifier of one of the wireless base stations 111 to 113 to cause this one of the wireless base stations 111 to 113 to transition from sleep mode to operating mode, and wirelessly communicates with the wireless base station that has thus transitioned.

The wireless base stations 111 to 113 are interconnected via a cable 110, and the same ESSID is assigned to them. Each of the wireless base stations 111 to 113 has the same configuration as one of the above-described wireless base stations 2, 2A, 2B and 2C. More specifically, if the terminal device 101 has the same configuration as the terminal device 1, each of the wireless base stations 111 to 113 has the same configuration as the wireless base station 2. If the terminal device 101 has the same configuration as the terminal device 1A, each of the wireless base station 111 to 113 has the same configuration as the wireless base station 2A. If the terminal device 101 has the same configuration as the terminal device 1B, each of the wireless base stations 111 to 113 has the same configuration as the wireless base station 2B. Finally, if the terminal device 101 has the same configuration as the terminal device 1C, each of the wireless base stations 111 to 113 has the same configuration as the wireless base station 2C.

Each of the wireless base stations 111 to 113 receives the plurality of activation probe requests PRQD1 to PRQDn from the terminal device 101 and, if the plurality of frame lengths of the received plurality of activation probe requests PRQD1 to PRQDn, the one or more differential frame lengths calculated based on the plurality of frame lengths, or the one or more differential frame lengths/reference values calculated based on the plurality of frame lengths match the identifier of its own, it transitions from sleep mode to operating mode. Then, each of the wireless base stations 111 to 113 wirelessly communicates with the terminal device 101.

If the terminal device 101 has the same configuration as one of the terminal devices 1, 1A and 1B and each of the wireless base stations 111 to 113 has the same configuration as one of the wireless base stations 2, 2A and 2B, the ESSID group that represents an identifier of the wireless base stations 111 to 113 is set by the designer of the wireless communication system 100 in the terminal device 101 and wireless base stations 111 to 113.

On the other hand, if the terminal device 101 has the same configuration as the terminal device 1C and each of the wireless base stations 111 to 113 has the same configuration as the wireless base station 2C, the ESSID group that represents an identifier of the wireless base stations 111 to 113 is automatically set in the terminal device 101 and the wireless base stations 111 to 113.

Since the wireless base stations 111 to 113 have the same ESSID, the terminal device 101, in any location in the wireless LAN environment with the same ESSID, can activate a wireless base station (i.e. one of the wireless base stations 111 to 113) and can wirelessly communicate with the activated wireless base station (i.e. one of the wireless base stations 111 to 113).

Further, while the terminal device 101 is moving when wirelessly communicating with one of the wireless base stations 111 to 113, it can activate another wireless base station. Since a normal probe request PRQ can be transmitted even when the terminal device is allocated to a wireless base station, in preferred embodiment 4, the terminal device 101, when wirelessly communicating with one of the wireless base stations 111 to 113, transmits a plurality of activation probe requests PRQD1 to PRQDn to activate another wireless base station.

The other description of preferred embodiment 4 is the same as the description of preferred embodiments 1 to 3.

In the above description, the wake-up signal receivers 23, 23A and 23B detect an envelope of a reception radio wave; however, a preferred embodiment of the present invention is not limited to such a method, and the wake-up signal receivers 23, 23A and 23B may perform synchronous detection or regenerative detection instead of envelop detection.

In general terms, a reception radio wave may be detected by any method that can detect a reception radio wave.

Further, in the above description, a plurality of activation probe requests PRQD1 to PRQDn are transmitted on all channels; however, a preferred embodiment of the present invention is not limited to such a method, and a plurality of activation probe requests PRQD1 to PRQDn may be transmitted on one or more channels.

In the above described preferred embodiments 1 to 4, the terminal device activates a wireless base station when it is not allocated to the wireless base station; however, a preferred embodiment of the present invention is not limited to such a method and only requires that, when a terminal device has not established a wireless link between itself and another wireless device, it activate the wireless device. For example, in an ad hoc wireless network, a wireless device as a transmitting source may activate a wireless device that is located near it in the above-described manner and wirelessly communicates with this wireless device.

In the above described preferred embodiments 1 to 4, the terminal device causes a wireless base station to transition from sleep mode to operating mode, which corresponds to the terminal device controlling the wireless base station to transition from sleep mode to operating mode. As a result, the above-described plurality of activation probe requests PRQD1 to PRQDn correspond to a plurality of control probe requests.

Then, in a preferred embodiment of the present invention, the terminal device may not only control the wireless base station, but also control another wireless base station connected to this wireless base station via a cable or a device connected to the wireless base station via a cable. In this case, the terminal device may transmit a plurality of control probe requests having a plurality of frame lengths that represent an identifier of another wireless base station or device that is to be controlled, and the wireless base station may detect the plurality of frame lengths of the plurality of control probe requests that have been received from the terminal device and transmit to another wireless base station (or device), via a cable, the plurality of frame lengths, the one or more differential frame lengths or the one or more differential frame lengths/reference values. The recipient of the plurality of control probe requests from the terminal device need not be a wireless base station, and, in general terms, may be a wireless device.

Thus, the wireless device receiving a plurality of control probe requests from the terminal device may include a detection circuitry that detects the plurality of frame lengths of a plurality of control probe requests that represent an identifier and have one or more frame lengths, and a control circuitry that generates a control signal when the detected plurality of frame lengths represent the identifier.

Further, in a preferred embodiment of the present invention, the terminal device may transmit a plurality of control probe requests when it has established a wireless link between itself and another wireless device (including a wireless base station). That is, in preferred embodiment of the present invention, the terminal device may transmit a plurality of control probe requests that represent an identifier and have one or more frame lengths as management frames in active scanning on one or more channels regardless of whether it has established a wireless link between itself and another wireless device (including a wireless base station) or has not established a wireless link between itself and another wireless device (including a wireless base station).

Thus, the terminal device according to various preferred embodiments of the present invention may include an instructing circuitry that generates an instruction signal for instructing an initiation of control, and a transmitting circuitry that, upon receiving the instruction signal, uses a probe request that is a management frame in active scanning in a wireless LAN to generate a plurality of control probe requests that represent an identifier and have one or more frame lengths and transmits the generated plurality of control probe requests on one or more channels in active scanning.

If the terminal device transmits a plurality of control probe requests when it has established a wireless link between itself and another wireless device (including a wireless base station), the plurality of control probe requests may include a connection probe request generated based on the actual ESSID. For example, if the plurality of control probe requests are four control probe requests PRCTL1 to PRCTL4 and the ESSID group is made of dummy ESSID1, dummy ESSID2, dummy ESSID3 and ESSID4, the four control probe requests PRCTL1 to PRCTL4 have four frame lengths L1 to L4 determined based on dummy ESSID1, dummy ESSID2, dummy ESSID3 and ESSID4, respectively, and use these four frame lengths L1 to L4 to represent an identifier of another device (i.e. wireless base station, device or the like) that is to be controlled, and the fourth control probe request PRCTL4 is a connection probe request having the frame length L4 that has been determined based on the actual ESSID.

Thus, the wireless device that has received the four control probe requests PRCTL1 to PRCTL4 from the terminal device detects the four frame lengths L1 to L4 of the four control probe requests PRCTL1 to PRCTL4 to detect the identifier of the device to be controlled, and, in response to the fourth control probe request PRCTL4 (i.e. connection probe request), establishes a wireless link between itself and the terminal device. In this case, the terminal device transmits the four control probe requests PRCTL1 to PRCTL4 without recognizing that one of the four control probe requests PRCTL1 to PRCTL4 is a connection probe request.

Furthermore, a program which is operated in the terminal device, wireless base station, host system, and other devices of various preferred embodiments of the present invention, is a program (program causing a computer to function) controlling a CPU or the like, in order to realize functions of the various preferred embodiments according to the present invention, including each of the various circuitry described herein and recited in the claims. Therefore, information which is handled by the terminal device, the wireless base station, the host system, or other devices is temporarily accumulated in a RAM at the time of the processing. Thereafter, the information is stored in various types of circuitry in the form of ROMs and HDDs, and is read out by circuitry within, or included in combination with, the CPU as necessary, and modification or write-in is performed thereto. As a recording medium storing the program, any one of a semiconductor medium (for example, the ROM, a nonvolatile memory card or the like), an optical recording medium (for example, a DVD, an MO, an MD, a CD, a BD or the like), and a magnetic recording medium (for example, a magnetic tape, a flexible disc or the like) may be used. Moreover, by executing the loaded program, the functions of the various preferred embodiments of the present invention are not only realized, but the functions of the present invention may be realized by processing the loaded program in combination with an operating system or other application programs, based on an instruction of the program.

Moreover, in a case of being distributed in a market, the program can be distributed by being stored in the portable recording medium, or the program can be transmitted to a server computer which is connected through a network such as the Internet. In this case, a storage device of the server computer is also included in the present invention. Still more, in the preferred embodiments described above, a portion of terminal device, the wireless base station, the host system, or other devices, or the whole thereof may be realized as an LSI which is typically an integrated circuit. Each functional block or circuitry of the terminal device, the wireless base station, the host system, or other devices, may be individually chipped, or a portion thereof, or the whole thereof may be chipped by being integrated. In a case of making each functional block or circuitry as an integrated circuit, an integrated circuit controller that controls the integrated circuits, is added.

Additionally, the method for making an integrated circuit is not limited to the LSI, and may be realized by a single-purpose circuit or a general-purpose processor. Moreover, in a case of an appearance of a technology for making an integrated circuit which replaces the LSI due to an advance of a semiconductor technology, it is possible to use an integrated circuit depending on the technology.

As described above, the preferred embodiments of the present invention are described in detail with reference to the drawings, but specific configurations thereof are not limited to the preferred embodiments described herein. A design or the like in the scope without departing the gist of the present invention, is also included in the scope of the claims.

It should be understood that the preferred embodiments disclosed herein are exemplary in every respect and not limiting. It is contemplated that the scope of the present invention is defined by the Claims and not by the above description of the preferred embodiments, and includes all modifications within the spirit and scope equivalent to those of the Claims.

INDUSTRIAL APPLICABILITY

The present invention is useful as a terminal device, a wireless device that communicates wirelessly with such a terminal device, and a wireless communication system that includes such a terminal device and wireless device.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A terminal device that communicates with one or more wireless base stations by establishing a wireless link between the terminal device and the one or more wireless base stations, the terminal device comprising:
    instructing circuitry generating an instruction signal that instructs initiation of control when the terminal device has not established any wireless link between the terminal device and any one of the one or more wireless base stations; and
    transmitting circuitry that, when having received the instruction signal, uses a probe request which is a management frame in active scanning in a wireless LAN to generate a plurality of control probe requests representing an identifier and having one or more frame lengths, and transmits the generated plurality of control probe requests on one or more channels in the active scanning; wherein
    the identifier identifies a wireless base station of the one or more wireless base stations that the terminal device is to be connected with,
    the transmitting circuitry determines, based on the identifier, each frame length of the plurality of control probe requests, and then sequentially transmits the plurality of control probe requests each having a successively longer frame length,
    the plurality of control probe requests includes requests D1 to DK, where K is a natural number not less than 2, where each of the requests D1 to DK is one of N types of control probe requests, where N is a natural number not less than 2, and
    an i-th control probe request, where i is a natural number satisfying 1≤i≤N, has a frame length different from each of frame lengths of the control probe requests other than the i-th control probe request.

2. The terminal device according to claim 1, wherein the transmitting circuitry transmits the plurality of control probe requests on the one or more channels by transmitting the plurality of control probe requests on each of the one or more channels.

3. The terminal device according to claim 2, wherein the transmitting circuitry transmits the plurality of control probe requests on the one or more channels so that the identifier is represented by one or more differential frame lengths, each of the one or more differential frame lengths being a difference between a reference frame length composed of one frame length selected from a plurality of frame lengths of the plurality of control probe requests and each of residual frame lengths that is other than the reference frame length in the plurality of frame lengths.

4. The terminal device according to claim 2, wherein the transmitting circuitry transmits the plurality of control probe requests on the one or more channels so that the identifier is represented by first values obtained by dividing one or more differential frame lengths by a reference value composed of one differential frame length selected from the plurality of differential frame lengths, the one or more differential frame lengths each being a difference between a reference frame length composed of one frame length selected from a plurality of frame lengths of the plurality of control probe requests and each of residual frame lengths that is other than the reference frame length in the plurality of frame lengths.

5. The terminal device according to claim 1, wherein the transmitting circuitry transmits the plurality of control probe requests on the one or more channels by performing, for every one of the plurality of control probe requests, a transmission process in which one control probe request having one frame length is transmitted on the one or more channels.

6. The terminal device according to claim 1, further comprising:
    receiving circuitry receiving, from a wireless base station of the one or more wireless base stations to which connection is being made, a plurality of network identifiers that are used to represent the identifier using a plurality of frame lengths of the plurality of control probe requests and that some of the plurality of network identifiers are dummy network identifiers; and
    setting circuitry setting in the terminal device the plurality of network identifiers received by the receiving circuitry,
    wherein the transmitting circuitry transmits a connection probe request as a management frame in the active scanning, and, when the setting circuitry has set the plurality of network identifiers in the terminal device, generates the plurality of control probe requests based on the plurality of network identifiers and transmits the generated plurality of control probe requests on the one or more channels.

7. The terminal device according to claim 1, wherein the wireless base station of the one or more wireless base stations to which the terminal device is to be connected includes a plurality of wireless base stations that each have an identical network identifier, and
the transmitting circuitry transmits the plurality of control probe requests on the one or more channels.

8. A wireless device that communicates with a terminal device by a modulation signal, the wireless device comprising:
an antenna that receives the modulation signal;
a main device that communicates with the terminal device via the antenna in a state in which the wireless device is operating; and
a wake-up signal receiver that generates a control signal to activate the main device, the wake-up signal receiver including:
detection circuitry that sequentially detects a plurality of frame lengths of a plurality of control probe requests representing an identifier and having one or more frame lengths each being successively longer; and
control circuitry that, when the detected plurality of frame lengths represent the identifier, generates a control signal to activate the main device and then outputs the generated control signal to the main device; wherein
the detection circuitry determines the identifier based on a length of the modulation signal,
the main device is activated in response to receiving the control signal from the control circuitry of the wake-up signal receiver,
the plurality of control probe requests includes requests D1 to DK, where K is a natural number not less than 2, where each of the requests D1 to DK is one of N types of control probe requests, where N is a natural number not less than 2, and
an i-th control probe request, where i is a natural number satisfying $1 \leq i \leq N$, has a frame length different from each of frame lengths of the control probe requests other than the i-th control probe request.

9. The wireless device according to claim 8, wherein the control circuitry generates the control signal when one or more differential frame lengths represent the identifier, the one or more differential frame lengths each being a difference between a reference frame length composed of one frame length selected from the plurality of frame lengths of the plurality of control probe requests and each of residual frame lengths that is other than the reference frame length in the plurality of frame lengths.

10. The wireless device according to claim 8, wherein the control circuitry generates the control signal when first values represent the identifier, the first values being obtained by dividing one or more differential frame lengths by a reference value composed of one differential frame length selected from the plurality of differential frame lengths, the one or more differential frame lengths each being a difference between a reference frame length composed of one frame length selected from the plurality of frame lengths of the plurality of control probe requests and each of residual frame lengths that is other than the reference frame length in the plurality of frame lengths.

11. The wireless device according to claim 8, wherein the control circuitry generates the control signal when it has verified a plurality of times that the plurality of frame lengths represent the identifier.

12. The wireless device according to claim 8, wherein, when a currently-detected frame length that is different from a previously-detected frame length, the control circuitry specifies that the currently-detected frame length is one of the plurality of frame lengths that represent the identifier, and, when the control circuitry has verified that the plurality of frame lengths of the plurality of control probe requests represent the identifier, it generates the control signal.

13. A wireless communication system comprising:
a terminal device that communicates with one or more wireless base stations by establishing a wireless link between the terminal device and the one or more wireless base stations, wherein
the terminal device includes:
instructing circuitry generating an instruction signal that instructs initiation of control when the terminal device has not established any wireless link between the terminal device and any one of the one or more wireless base stations; and
transmitting circuitry that, when having received the instruction signal, uses a probe request which is a management frame in active scanning in a wireless LAN to generate a plurality of control probe requests representing an identifier and having one or more frame lengths, and transmits the generated plurality of control probe requests on one or more channels in the active scanning;
the identifier identifies a wireless base station of the one or more wireless base stations that the terminal device is to be connected with,
the transmitting circuitry determines, based on the identifier, each frame length of the plurality of control probe requests, and then sequentially transmits the plurality of control probe requests each having a successively longer frame length,
the plurality of control probe requests includes requests D1 to DK, where K is a natural number not less than 2, where each of the requests D1 to DK is one of N types of control probe requests, where N is a natural number not less than 2, and
an i-th control probe request, where i is a natural number satisfying $1 \leq i \leq N$, has a frame length different from each of frame lengths of the control probe requests other than the i-th control probe request.

14. A wireless communication system comprising:
a wireless device that communicates with a terminal device by a modulation signal, wherein
the wireless device includes:
an antenna that receives the modulation signal;
a main device that communicates with the terminal device via the antenna in a state in which the wireless device is operating; and
a wake-up signal receiver that generates a control signal to activate the main device, the wake-up signal receiver including:
detection circuitry that sequentially detects a plurality of frame lengths of a plurality of control probe requests representing an identifier and having one or more frame lengths each being successively longer; and
control circuitry that, when the detected plurality of frame lengths represent the identifier, generates a control signal to activate the main device and then outputs the generated control signal to the main device;

the detection circuitry determines the identifier based on a length of the modulation signal;

the main device is activated in response to receiving the control signal from the control circuitry of the wake-up signal receiver;

the plurality of control probe requests includes requests D1 to DK, where K is a natural number not less than 2, where each of the requests D1 to DK is one of N types of control probe requests, where N is a natural number not less than 2; and an i-th control probe request, where i is a natural number satisfying $1 \leq i \leq N$, has a frame length different from each of frame lengths of the control probe requests other than the i-th control probe request.

* * * * *